US008558792B2

(12) United States Patent
Momose

(10) Patent No.: US 8,558,792 B2
(45) Date of Patent: Oct. 15, 2013

(54) STORAGE MEDIUM STORING GAME PROGRAM AND GAME APPARATUS THEREFOR

(75) Inventor: Hiroshi Momose, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 907 days.

(21) Appl. No.: 11/304,631

(22) Filed: Dec. 16, 2005

(65) Prior Publication Data

US 2006/0227139 A1    Oct. 12, 2006

(30) Foreign Application Priority Data

Apr. 7, 2005 (JP) .................................. 2005-110968

(51) Int. Cl.
- *G09G 5/08* (2006.01)
- *G06F 3/033* (2013.01)
- *G06F 17/00* (2006.01)
- *G06F 19/00* (2011.01)
- *A63F 9/24* (2006.01)
- *A63F 13/00* (2006.01)

(52) U.S. Cl.
USPC .......................................... 345/162; 463/31

(58) Field of Classification Search
USPC ......... 345/441, 629–630, 636, 442–443, 179, 345/162; 715/211, 263, 707, 780, 814, 715/863–864
See application file for complete search history.

(56) References Cited

U.S. PATENT DOCUMENTS

| | | | |
|---|---|---|---|
| 4,618,927 A | 10/1986 | Hatta | |
| 5,390,937 A | 2/1995 | Sakaguchi et al. | |
| 5,410,494 A | 4/1995 | Hashimoto et al. | |
| 5,465,325 A | 11/1995 | Capps et al. | |
| 5,485,565 A | 1/1996 | Saund et al. | |
| 5,500,937 A | 3/1996 | Thompson-Rohrlich | |
| 5,502,803 A * | 3/1996 | Yoshida et al. | ............... 715/201 |

(Continued)

FOREIGN PATENT DOCUMENTS

| | | |
|---|---|---|
| JP | 58-066176 | 4/1983 |
| JP | 62-082486 | 4/1987 |

(Continued)

OTHER PUBLICATIONS

TBD: "Electronic Calculator Based on Character Recognition of Input from Stylus Acceleration Dynamics," IBM Technical Disclosure Bulletin, pp. 2816-1827 (Dec. 1976).

(Continued)

*Primary Examiner* — Jonathan Horner
(74) *Attorney, Agent, or Firm* — Nixon & Vanderhye PC

(57) ABSTRACT

The present invention is a storage medium storing a game program to be executed by a computer in a game apparatus comprising an input device for detecting positions designated by a player on an input surface. The game apparatus calculates an input graphic drawn on the input surface by using the positions detected by the input device. The game apparatus further calculates a degree of similarity between a share of each reference pattern indicated by previously stored shape data and a shape of the input graphic. Also, the game apparatus sets a reference value to each of the reference patterns. The game apparatus identifies the shape of the input graphic from among a plurality of reference patterns by using a result obtained by performing a predetermined calculation for each of the plurality of reference patterns through using the degree of similarity and the reference value set to one process is performed in accordance with the identified shape.

33 Claims, 27 Drawing Sheets

(56) References Cited

U.S. PATENT DOCUMENTS

| | | | |
|---|---|---|---|
| 5,592,608 A | 1/1997 | Weber et al. | |
| 5,596,656 A | 1/1997 | Goldberg | |
| 5,636,297 A * | 6/1997 | Eller et al. | 382/293 |
| 5,638,462 A * | 6/1997 | Shirakawa | 382/186 |
| 5,751,853 A | 5/1998 | Michael | |
| 5,774,582 A * | 6/1998 | Gat et al. | 382/186 |
| 5,798,769 A | 8/1998 | Chiu et al. | |
| 5,880,717 A | 3/1999 | Chan et al. | |
| 5,882,262 A | 3/1999 | Ballhorn | |
| 5,920,309 A | 7/1999 | Bisset et al. | |
| 6,057,830 A | 5/2000 | Chan et al. | |
| 6,057,845 A | 5/2000 | Dupouy | |
| 6,149,523 A | 11/2000 | Yamada et al. | |
| 6,165,073 A | 12/2000 | Miyamoto et al. | |
| 6,215,901 B1 * | 4/2001 | Schwartz | 382/186 |
| 6,244,956 B1 | 6/2001 | Nakayama et al. | |
| 6,278,445 B1 | 8/2001 | Tanaka et al. | |
| 6,461,237 B1 | 10/2002 | Yoshinobu et al. | |
| 6,482,086 B1 | 11/2002 | Rimoto et al. | |
| 6,482,090 B1 | 11/2002 | Rimoto et al. | |
| 6,493,736 B1 | 12/2002 | Forcier | |
| 6,626,760 B1 | 9/2003 | Miyamoto et al. | |
| 6,668,081 B1 * | 12/2003 | Ilan et al. | 382/187 |
| 6,738,049 B2 | 5/2004 | Kiser et al. | |
| 6,761,632 B2 | 7/2004 | Bansemer et al. | |
| 6,966,837 B1 | 11/2005 | Best | |
| 7,004,394 B2 | 2/2006 | Kim | |
| 7,098,896 B2 | 8/2006 | Kushler et al. | |
| 7,535,460 B2 * | 5/2009 | Momose | 345/173 |
| 7,771,279 B2 * | 8/2010 | Miyamoto et al. | 463/31 |
| 2001/0035859 A1 | 11/2001 | Kiser et al. | |
| 2002/0041713 A1 * | 4/2002 | Imagawa et al. | 382/229 |
| 2002/0097229 A1 | 7/2002 | Rose et al. | |
| 2002/0141643 A1 | 10/2002 | Jaeger | |
| 2002/0155890 A1 | 10/2002 | Ha et al. | |
| 2003/0006967 A1 | 1/2003 | Pihlaja | |
| 2003/0087699 A1 * | 5/2003 | Brumagin et al. | 463/37 |
| 2003/0090474 A1 | 5/2003 | Schaefer | |
| 2003/0216177 A1 | 11/2003 | Aonuma et al. | |
| 2004/0002380 A1 | 1/2004 | Brosnan et al. | |
| 2004/0014513 A1 | 1/2004 | Boon | |
| 2004/0085300 A1 | 5/2004 | Matusis | |
| 2004/0110560 A1 | 6/2004 | Aonuma | |
| 2004/0130525 A1 | 7/2004 | Suchocki | |
| 2005/0024341 A1 | 2/2005 | Gillespie et al. | |
| 2005/0052406 A1 | 3/2005 | Stephanick et al. | |
| 2005/0159223 A1 * | 7/2005 | Tahara et al. | 463/43 |
| 2005/0164794 A1 * | 7/2005 | Tahara | 463/43 |
| 2005/0190973 A1 | 9/2005 | Kristensson et al. | |

FOREIGN PATENT DOCUMENTS

| | | | |
|---|---|---|---|
| JP | 61-168347 | | 2/1988 |
| JP | 01-177682 | | 7/1989 |
| JP | 03-212782 | * | 9/1991 |
| JP | 04-238585 | | 8/1992 |
| JP | 7-29002 | | 1/1995 |
| JP | 07-093560 | | 4/1995 |
| JP | H9-44598 | | 2/1997 |
| JP | 10-154224 | | 6/1998 |
| JP | H10-198760 | | 7/1998 |
| JP | H5-57633 | | 8/1998 |
| JP | H10-328414 | | 12/1998 |
| JP | H11-120291 | | 4/1999 |
| JP | 11-134509 | | 5/1999 |
| JP | 2000-218046 | | 8/2000 |
| JP | 2000-222527 | | 8/2000 |
| JP | 3350009 | | 9/2002 |
| JP | 2003-79943 | | 3/2003 |
| JP | 2004-038736 | * | 2/2004 |

OTHER PUBLICATIONS

Kara, Levent Burak, Ph.D. Thesis Proposal, "Sketch Understanding for Engineering Software," 68 pages. (Aug. 13, 2003).

Xin, Gong et al., "HMM based online hand-drawn graphic symbol recognition," ICSP'02 2002 6th International Conference on Signal Processing Proceedings, Part vol. 2, pp. 1067-1070 (2002).

New Game & CD-ROM Information CD-ROM Acrobatic Group, PC fan, Mainichi Communications Inc., Sep. 15, 2003, vol. 10, No. 20, p. 134-135—partial translation.

Notice of Reasons for Rejection dated Jul. 30, 2010 in corresponding Japanese Application No. JP2005-110968.

Michael Shilman et al., "Discerning Structure from Freeform Handwritten Notes," Aug. 2003, 6 pages. http://www.shilman.net/papers/shilman_discerning_icdar03.pdf.

Manuel Fonseca et al., "Experimental Evaluation of an On-Line Scribble Recognizer," Oct. 2001, 8 pages. http://web.ist.utl.pt/mjf/publications/2004-1999/pdf/recpad00.pdf.

* cited by examiner

| Pn | P0 | P1 | P2 | P3 | P4 | P5 | P6 |
|---|---|---|---|---|---|---|---|
| Θn | 0 | 50 | 120 | 190 | 250 | 300 | × |
| Ln | 0 | 55 | 115 | 170 | 245 | 310 | 360 |

Fig. 21

| GRAPHIC NUMBER | GRAPHIC DATA | DEFAULT REFERENCE VALUE |
|---|---|---|
| 1 | DATA A | 50 |
| 2 | DATA B | 80 |
| 3 | DATA C | 40 |
| ⋮ | ⋮ | ⋮ |

Fig. 22

| GRAPHIC SEQUENCE | MAGIC EFFECT |
|---|---|
| (1) | CAUSE EXPLOSION |
| (1)→(2) | CAUSE TORNADO |
| (1)→(2)→(3) | DISCHARGE VACUUM WAVE |
| (1)→(2)→(3)→(4) | CAUSE LIGHTENING BOLTS |
| (1)→(3) | DROP ROCK |
| ⋮ | ⋮ |

Fig. 23

| GRAPHIC NUMBER | ADJUSTMENT AMOUNT FOR A CASE WHERE REFERENCE PATTERN IS FIRSTLY INPUTTED | ADJUSTMENT AMOUNT FOR A CASE WHERE REFERENCE PATTERN IS SECONDLY INPUTTED | ADJUSTMENT AMOUNT FOR A CASE WHERE REFERENCE PATTERN IS INPUTTED THIRDLY OR AFTER |
|---|---|---|---|
| 1 | 0 | +5 | +10 |
| 2 | 0 | 0 | +5 |
| 3 | 0 | +5 | +20 |
| ⋮ | ⋮ | ⋮ | ⋮ |

Fig. 24

| GRAPHIC NUMBER | AVERAGE DIFFERENCE AREA |
|---|---|
| 1 | 25 |
| 2 | 20 |
| 3 | 50 |
| ⋮ | ⋮ |

STORAGE MEDIUM STORING GAME PROGRAM AND GAME APPARATUS THEREFOR

CROSS REFERENCE OF RELATED APPLICATION

The disclosure of Japanese Patent Applications No. 2005-110968 is incorporated herein by reference.

BACKGROUND OF THE INVENTION

1. Field of the Invention

The present invention relates to a storage medium storing a game program and a game apparatus therefor, and more particularly, a storage medium storing a game programmed a game apparatus therefor for performing a game process in accordance with a shape of a trace inputted by a player.

2. Description of the Background Art

Conventionally, an information processing apparatus using a touch panel as an input device has been proposed, and it has been considered that a trace drawn by using a touch panel or the like is used for a game operation in a game apparatus also. That is, a game process in accordance with a shape of an input trace drawn by a player is performed in the game apparatus. For example, when the player wants a player character to use a desired magic in a roll playing game, the player inputs a trace instead of selecting a command for the magic. In a case of performing a game process in which the player character attacks an enemy character, for example, the game apparatus identifies a shape of the trace inputted by the player and performs the game process in which the player character attacks the enemy with the magic corresponding to the shape of the input trace.

In the above, the game apparatus identifies a graphic corresponding to the input trace from among graphics (i.e., reference patterns) previously prepared, and performs a game process corresponding to the identified graphic. A method for identifying a graphic corresponding to an input trace includes a method for performing a pattern matching between each of the reference patterns and the input trace and calculating a degree of similarity therebetween (e.g., see Japanese Laid-Open Patent Publication No. 10-154224). Under the method, the game apparatus calculates a degree of similarity between a shape of a reference pattern and a shape of an input trace for each of the reference patterns, and identifies a reference pattern closest (which matches) to the input trace based on the degree of similarity. The identified reference pattern is determined as a graphic inputted by the player, i.e., a graphic indicated by the input trace.

In the above game apparatus, the player aims to perform a desired game process and inputs a reference pattern by drawing a shape thereof corresponding to the desired game process. A level of easiness in drawing the reference patterns differs depending on a shape of each reference pattern. That is, among the reference patterns, one or more graphics have shapes difficult to input, and one or more other graphics have shapes easy to input. However, for all reference patterns, a degree of similarity is calculated using a same method, and therefore, one or more graphics are easily determined as relatively high in the degree of similarity, and conversely, one or more other graphics are easily determined as relatively low in the degree of similarity. Accordingly, when the player plays a game, there is a possibility that, among a plurality of the reference patterns, one or more graphics are difficult to be recognized by the game apparatus, namely, a successful input for the one or more reference patterns in drawing is difficult to be obtained. If one or more graphics difficult to be successfully inputted as described above exist, the player feels that controllability of the game is poor, and loses his/her interest toward the game.

On the other hand, it is conceivable that there is a case in which a game producer desires to change the level of input difficulty in accordance with a content of the game or a state of the game course. That is, a case is conceivable that an input of a particular reference pattern is made especially difficult or, conversely, easy. However, under the conventional method, the level of difficulty in input of a reference pattern depends entirely on the shape thereof and cannot be freely set by the game producer. Thus, when the game producer prepares reference patterns to be inputted by a player, the reference patterns must be prepared in consideration of shapes (the level of difficulty in input) of the reference patterns, and thereby limiting a degree of freedom for the game production.

SUMMARY OF THE INVENTION

Therefore, an object of the present invention is to provide a storage medium storing a game program in which a level of difficulty in input of a reference pattern can be freely set regardless a shape of the graphic and a game apparatus therefor.

The present invention has the following configurations to attain the object mentioned above. Note that reference numerals in parentheses, supplementary description, and the like in the present application are provided to indicate a corresponding relationship between the included embodiments and to help understand the present invention, and not to limit the present invention in any way.

The first aspect is directed to a storage medium storing a game program to be executed by a computer (e.g., CPU core 21) in a game apparatus (10) comprising an input device (e.g., touch panel 15) for detecting positions designated by a player on an input surface. A storage device (RAM 24) of the game apparatus stores shape data (a reference pattern table) indicating a shape of a reference pattern for a plurality of reference patterns. The game program causes the computer to function as graphic calculation means (e.g., S28 executed by the CPU core 21. Hereinafter, only step numbers are indicated), degree of similarity calculation means (S81), reference value setting means (S11 and S16), identification means (S85), and game processing means (S5). The graphic calculation means calculates an input graphic drawn on the input surface by using the positions detected by the input device. The degree of similarity calculation means calculates a degree of similarity (a difference area) between a shape of each reference pattern indicated by the shape data stored in the storage device and a shape of the input graphic. The reference value setting means sets a reference value to each of the reference patterns. The identification means identifies the shape of the input graphic from among the plurality of reference patterns by using a result obtained by performing a predetermined calculation (a reference value minus a difference area) for each of the plurality of reference patterns through using the degree of similarity and reference value set to one of the reference patterns for the degree of similarity. The game processing means performs a game process (a magic damage process) in accordance with the shape identified by the identification means.

Also, in a second aspect, the graphic calculation means may calculate at least one input graphic by using the positions detected within a predetermined time limit. Here, the degree of similarity calculation means calculates a degree of similarity between the input graphic and the plurality of reference patterns for each of the at least one input graphic. The identification means identifies a shape of each of the at least one input graphic from among the plurality of reference patterns by using the degree of similarity and the reference value. The game processing means performs a game process in accordance with the shape of the at least one input graphic.

In a third aspect, the reference value setting means may set a different value to the reference value to be set for each of the plurality of reference patterns in accordance with an order of input of the input graphic.

In a fourth aspect, the reference value setting means may set a different value to the reference value to be set for each of the plurality of reference patterns in accordance with a remained time period from a start of an input of the input graphic until the predetermined time limit is reached.

In a fifth aspect, the game program causes the computer to further function as input acceptance means for accepting an input value for the reference value of a predetermined reference pattern. Here, the reference value setting means sets the input value accepted by the input acceptance means as a reference value of the predetermined reference pattern.

In a sixth aspect, the game processing means may perform a different game process in accordance with the shape of the input graphic and the magnitude of the reference value set to the input graphic.

In a seventh aspect, the game program causes the computer to further function as history storage control means for storing, in the game apparatus, a history (history data 59) for the degree of similarity calculated by the degree of similarity calculation means for the reference pattern. Here, the reference value setting means changes the reference value to be set for the reference pattern in accordance with the history, for the degree of similarity of the reference pattern, stored in the game apparatus.

In an eighth aspect, the graphic calculation means may include detection means (S22), coordinate point selection means (S27), length calculation means (S55), and angle calculation means (S53 and S54). The detection means detects a trace drawn on the input surface as coordinate points in chronological order. The coordinate point selection means selects coordinate points representing the trace from among a group of coordinate points in which the detected coordinate points are arranged in chronological order. The length calculation means calculates lengths of line segments obtained by connecting the selected coordinate points in chronological order. The angle calculation means calculates, for each line segment, an absolute angle which the line segment forms with a previously determined reference straight line or a relative angle which the line segment forms with a line segment adjacent thereto. Here, the input graphic is indicated by the length of each line segment calculated by the length calculation means and the absolute angle or otherwise the relative angle calculated by the angle calculation means. The degree of similarity calculation means calculates, by comparing a trace graph in an orthogonal coordinate system, whose first axis indicates a distance from a starting point or an ending point of the selected coordinate points to each coordinate point along the line segment and whose second axis indicates an angle of the line segment whose start point is one of the selected coordinate points, with reference pattern graphs each respectively representing a plurality of types of previously prepared reference patterns in the orthogonal coordinate system, a degree of similarity between the trace graph and a reference pattern graph among the reference pattern graphs.

Also, the present invention may be provided in a form of a game apparatus for executing the aforementioned game program.

According to the first aspect, a reference pattern is identified by using a result obtained by performing a predetermined calculation through using a reference value set to each of the reference patterns and a degree of similarity, and not by using a degree of similarity as it is. Accordingly, a reference pattern to be identified can be changed by freely setting the reference value. Also, a level of difficulty in input of a reference pattern can be adjusted by adjusting the reference value. That is, according to the present aspect, the level of difficulty in input for each of the reference patterns can be freely set regardless a shape of the graphic.

According to the second aspect, a player inputs a plurality of input graphics, and a different game process is performed according to a combination of the plurality of input graphics inputted by the player. The player cannot only draw an input graphic but also perform a game operation by using a graphic sequence composed of a plurality of input graphics. Accordingly, the player can perform various game operations, and thereby increasing a level of entertainment of the game.

According to the third aspect, a different reference value is set in accordance with an order of input. Here, because a time limit is provided for the input performed by the player, the more the number of graphics which the player inputs, the less the remained time period becomes. Therefore, by setting a different reference value in accordance with the order of input, the level of difficulty in input can be changed in accordance with the remained time period. Accordingly, the level of difficulty in input can be decreased for the player performing an input under pressure caused by not having a sufficient remained time period, or conversely, the level of difficulty in input can be increased as the remained time period decreases for the purpose of increasing the difficulty level of the game, thereby increasing the level of entertainment of the game.

According to the fourth aspect, as is the case with the third aspect, the level of difficulty in input can be changed in accordance with the remained time period, thereby increasing the level of entertainment of the game.

According to the fifth aspect, the reference values are set by the player, and thereby enabling to set a reference value appropriate for an individual player.

According to the sixth aspect, a different game process is performed in accordance with the magnitude of the reference value, and therefore, in a case where the player inputs a same graphic as that of previously inputted, a different game unfolds in accordance with the magnitude of the reference value of the graphic. For example, an input is made difficult but instead, power of corresponding magic is increased, or conversely, an input is made easy but instead, power of corresponding magic is decreased. Accordingly, a different game process is performed in accordance with the level of difficulty in input, and thereby enhancing the level of entertainment in strategy making and keeping consistency over a level of difficulty of the game.

According to the seventh aspect, a reference value is set to a reference pattern in accordance with a history for a degree of similarity of the reference pattern, whereby an operation skill of the player can be used in changing the level of difficulty in input. For example, if a degree or similarity of a graphic inputted by the player is low for a reference pattern, by adjusting a reference value of the reference pattern, the level of difficulty in input of the reference pattern can be adjusted.

According to the eighth aspect, a degree of similarity between an input graphic and a reference pattern is determined in accordance with a degree of similarity between graphs (a trace graph and a reference pattern graph) indicating respective graphics. That is, the determination for a degree of similarity is performed in consideration of elements such as an absolute angle or otherwise a relative angle and a distance from a starting point or an ending point of each line segment to a vertex thereof, collectively. That is, according to the present aspect, a plurality of elements indicating characteristics of a graphic are collectively taken into account. Consequently, even if one of the elements is not precisely extracted due to a complicated shape of a graphic to be identified, the graphic can be accurately identified. In a case of identifying a graphic having a complicated shape, it is particularly difficult to precisely extract the number of vertices. However, according to the present aspect, even when the number of vertices cannot be precisely extracted in a thinning-process for vertices, the shape of the graphic can be accurately identified.

These and other objects, features, aspects and advantages of the present invention will become more apparent from the following detailed description of the present invention when taken in conjunction with the accompanying drawings.

BRIEF DESCRIPTION OF THE DRAWINGS

FIG. 21 is an illustration showing one example of a reference pattern table;

FIG. 22 is an illustration showing one example of a graphic sequence table;

FIG. 23 is an illustration showing one example of a reference value setting table;

FIG. 24 is an illustration showing one example of history data;

DESCRIPTION OF THE PREFERRED EMBODIMENTS

Figure 1:
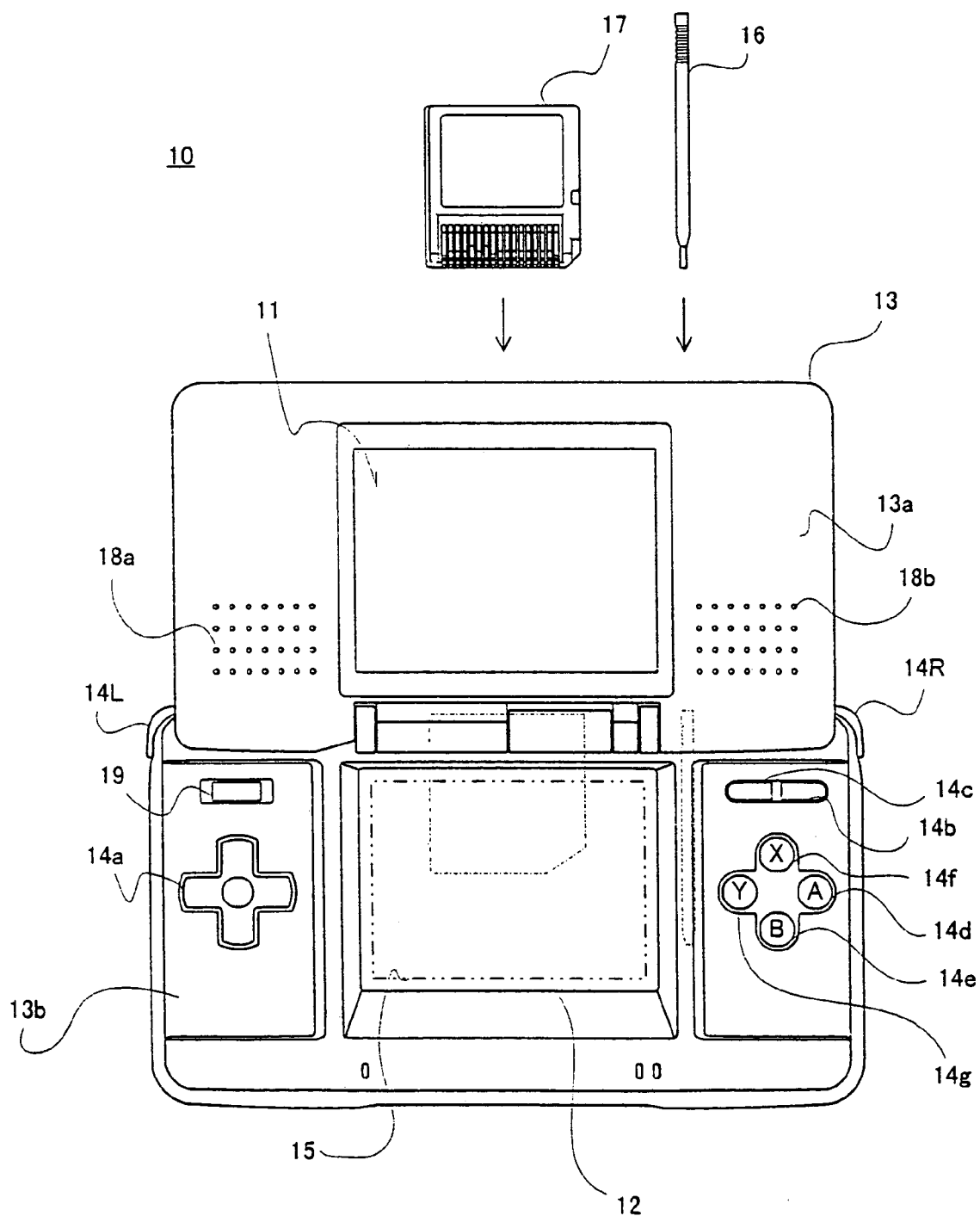
FIG. 1 is a view illustrating an outer appearance of a game apparatus according to an embodiment of the present invention.

Hereinafter, a game program and a game apparatus according to an embodiment of the present invention are described. Firstly, a structure of a hand-held game apparatus which is an example of the game apparatus for executing the game program will be described. FIG. 1 is a view illustrating an outer appearance of the game apparatus. In FIG. 1, a game apparatus 10 includes a first Liquid Crystal Display (LCD: liquid crystal display device) 11, and a second LCD 12. A housing 13 is provided with an upper housing 13a and a lower housing 13b, the first LCD 11 is accommodated in the upper housing 13a, and the second LCD 12 is accommodated in the lower housing 13b. A resolution for each of the first LCD 11 and the second LCD 12 is 256 dots×192 dots. In a first embodiment, an LCD is used as a display device, but another arbitrary display device such as, for example, a display device using an Electro Luminescence (EL: Electroluminescence) can be employed. Also, an arbitrary resolution can be employed.

In the upper housing 13a, provided are sound holes 18a and 18b for outputting a sound from a pair of loudspeakers (30 in FIG. 2) described below.

In the lower housing 13b, provided as input devices are a cross switch 14a, a start switch 14b, a select switch 14c, an A button 14d, a B button 14e, an X button 14f, an Y button 14g, an L button 14L, and an R button 14R. Also, as further input devices, a touch panel 15 (indicated by two-dot chain line in FIG. 1) is provided on a screen of the second LCD 12. Also, in the lower housing 13b, a power switch 19 and insertion slots (indicated by one-dot chain line in FIG. 1) for accommodating a memory card 17 and a stick 16 are also provided.

As for the touch panel 15, an arbitrary type such as, for example, a resistive film type, an optical type (infrared type), or a capacitive coupling type can be employed. The touch panel 15 has a function of outputting, when a surface thereof is touched by the stick 16, coordinate data corresponding to the touched position. Hereinafter, although the description takes place based on an assumption that a player operates the touch panel 15 with the stick 16, it is certainly possible to operate the touch panel 15 with a pen (stylus pen) or a finger instead of the stick 16. In the first embodiment, the touch panel 15 having, similar to the resolution of the second LCD 12, a resolution (detection accuracy) of 256 dots×192 dots is employed. Note that the resolution for the touch panel 15 and that for the second LCD 12 do not always need to be matched.

The memory card 17 is a storage medium storing a game program therein, and detachably inserted to the insertion slot provided in the lower housing 13b.

Figure 2:
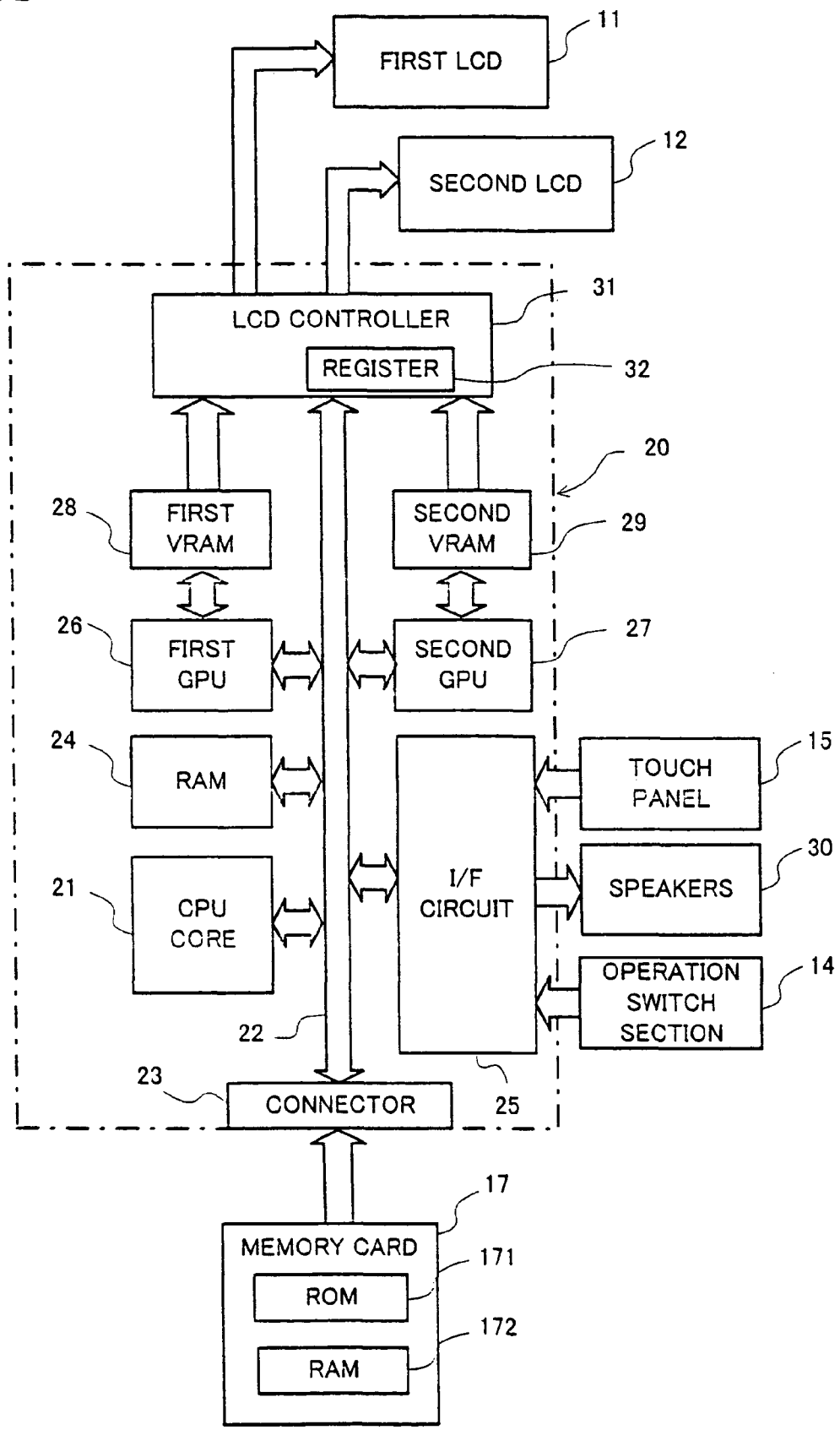
FIG. 2 is an illustration showing an internal structure of the game apparatus.

Next, referring to FIG. 2, an internal structure of the game apparatus 10 will be described. In FIG. 2, a CPU core 21 is mounted on an electronic circuit board 20 accommodated in the housing 13. Via a bus 22, the CPU core 21 is connected to a connector 23, an input/output interface circuit (denoted as an I/F circuit in the drawings) 25, a first Graphics Processing Unit (GPU) 26, a second GPU 27, a RAM 24, and an LCD controller 31. The memory card 17 is detachably connected to the connector 23. The memory card 17 includes a ROM 171 for storing a game program and a Ram 172 for storing backup data in a rewritable manner. The game program stored in the ROM 171 of the memory card 17 is loaded to the RAM 24, and the game program having been loaded to the RAM 24 is executed by the CPU core 21. In addition to the game program, stored in the RAM 24 are temporary data obtained by the CPU core 21 by executing the game program and data for generating game images. The touch panel 15, loudspeakers 30, and an operation switch section 14 including the cross switch 14a, the A button 14d, and the like in FIG. 1 are connected to the I/F circuit 25. The loudspeakers 30 are placed inside the sound holes 18a and 18b.

The first GPU 26 is connected to a first Video RAM (VRAM) 28, and the second GPU 27 is connected to a second VRAM 29. In accordance with an instruction from the CPU core 21, the first GPU 26 generates a first game image by using the data stored in the RAM 24 for generating a game image, and writes image data into the first VRAM 28. Similarly, in accordance with an instruction from the CPU core 21, the second GPU 27 generates a second game image, and writes image data into the second VRAM 29. The first VRAM 28 and the second VRAM 29 are connected to the LCD controller 31.

The LCD controller 31 includes a register 32. The register 32 stores a value "0" or "1" in accordance with an instruction from the CPU core 21. If the value in the register 32 is "0", the LCD controller 31 outputs, to the first LCD 11, the first game image written by the first VRAM 28, and outputs, to the second LCD 12, the second game image written by the second VRAM 29. If the value in the register 32 is "1", the LCD controller 31 outputs, to the second LCD 12, the first game image written by the first VRAM 28, and outputs, to the first LCD 11, the second game image written by the second VRAM 29.

Note that the above described structure of the game apparatus 10 is merely an example, and the present invention can be applied to an arbitrary computer system having at least one display device. Further, the game program of the present invention may not only be supplied to a computer system via an external storage medium such as the memory card 17, but may also be supplied to the computer system via a wired or a wireless communication line, or may also be previously stored in a nonvolatile storage apparatus inside the computer system.

Hereinafter, with reference to FIGS. 3 to 6, an outline of a game performed by executing a game program in the game apparatus 10 will be described. FIGS. 3 to 6 are illustrations showing one example of a game screen displayed on the first LCD 11 of the game apparatus 10. The present game performs a game operation by using an input with the touch panel 15. Specifically, the present game is a game (e.g., a roll playing game) in which a player character attacks an enemy character by using magic. In a battle scene of the player character and the enemy character, a player can instruct a type of magic to be used by the player character by drawing a predetermined reference pattern on the touch panel 15. A reference pattern is a graphic previously prepared in the game apparatus 10. A plurality of reference patterns to be inputted by the player are previously set in the game apparatus 10, and the player performs a touch input (input for the touch panel 15) in a shape of one of the graphics (reference patterns). Also, in the present game, the player can input one or more graphics in one operation (a magic instruction operation), and a type of magic is determined based on a combination of the one or more graphics inputted by the player.

Figure 3:
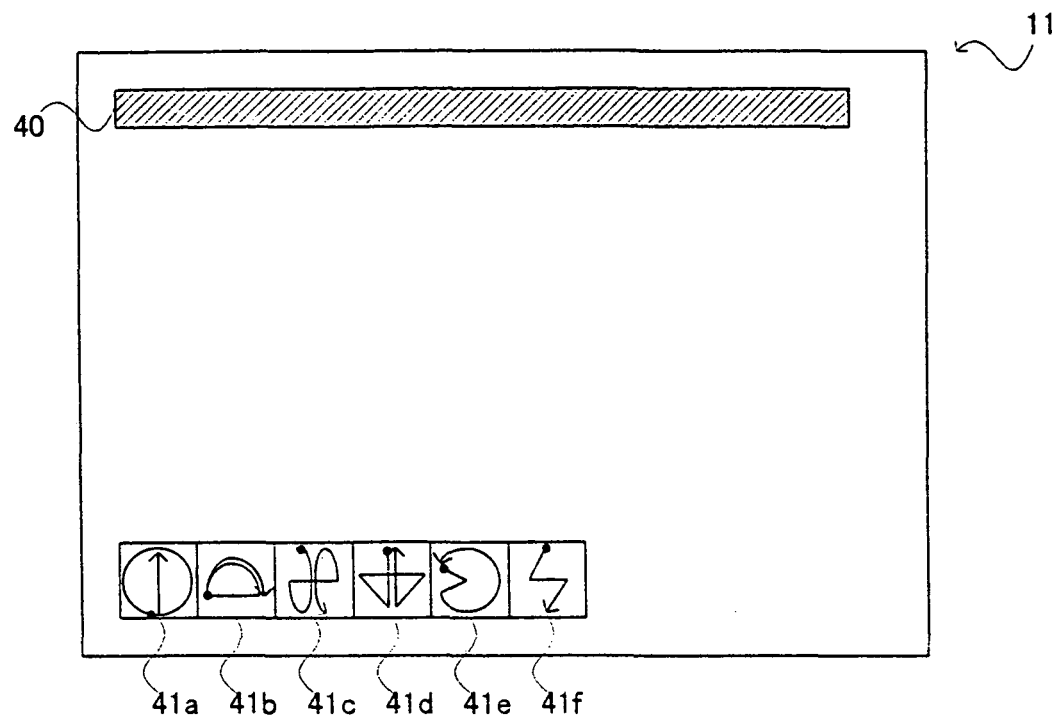
FIG. 3 is an illustration showing a game screen at a start of a battle scene.

FIG. 3 is an illustration showing a game screen displayed at a start of a battle scene. In the present game, there are a normal scene and a battle scene, and the battle scene starts when predetermined conditions are satisfied in the normal scene and the player character encounters the enemy character. When the battle scene starts, a game image as shown in FIG. 3 is first displayed on the first LCD 11. Here, on the second LCD 12 not shown, an image of the player character or the enemy character may be displayed, or no image may be displayed. Also, on the first LCD 11, the image of the player character or the enemy character may be displayed in addition to the image shown in FIG. 3. Note that the normal scene is irrelevant to the present invention, and therefore the description thereof is omitted.

As shown in FIG. 3, at the start of the battle scene, a gage 40 and reference pattern icons 41a, 41b, 41c, 41d, 41e, and 41f are displayed. The gage 40 indicates a time period for which the player can input graphics. Here, the game apparatus 10 starts to accept a touch input after the battle scene has started, and measures an elapsed time period from a start of the touch input being accepted. As the elapsed time period becomes long, the display of the gage 40 changes such that a shaded portion thereof shown in FIG. 3 becomes short (see FIGS. 4 to 6). Also, the reference pattern icons 41a, 41b, 41c, 41d, 41e, and 41f indicate graphics which the player can currently input. For example, in FIG. 3, the player can input six types of reference patterns indicated by six reference pattern icons 41a, 41b, 41c, 41d, 41e, and 41f. The player performs a touch input by drawing, from among the six types of reference patterns indicated by the reference pattern icons 41a, 41b, 41c, 41d, 41e, and 41f, a reference pattern corresponding to a desired magic.

Figure 4:
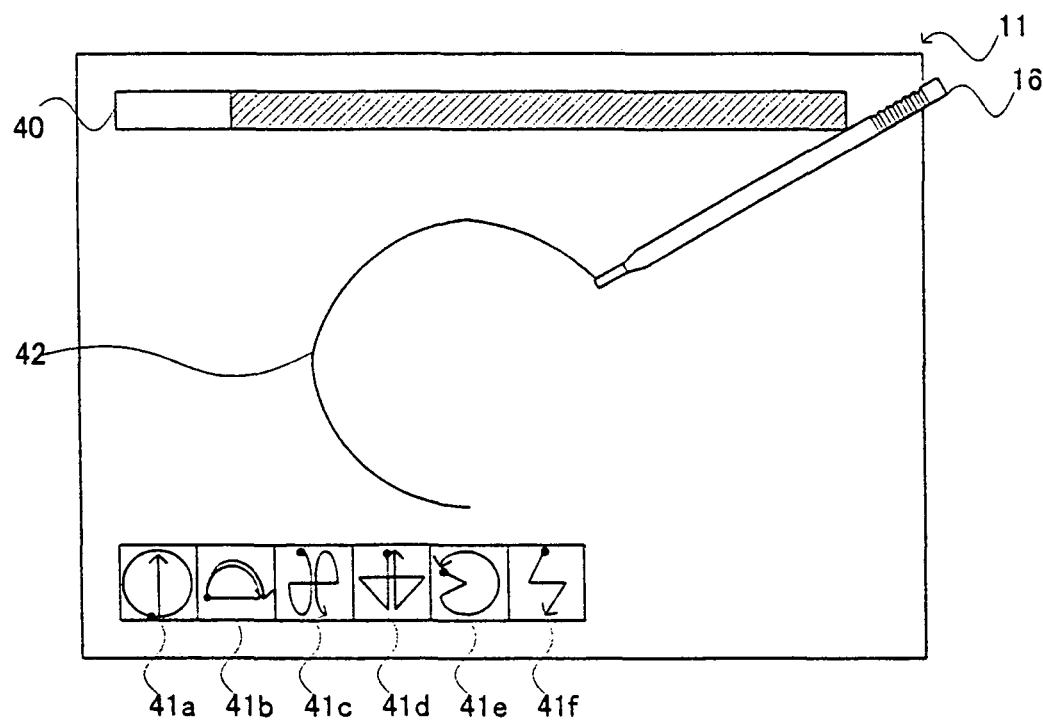
FIG. 4 is a an illustration showing a game screen displayed when a player performs a touch input with a stick 16.

FIG. 4 is an illustration showing a game screen displayed when the player performs a touch input with the stick 16. Note that, in FIG. 4, the player draws a graphic illustrated by the reference pattern icon 41a from among the reference pattern icons 41a, 41b, 41c, 41d, 41e, and 41f. Here, a trace (trace image 42) drawn by the player performing the touch input is displayed on the first LCD 11.

Figure 5:
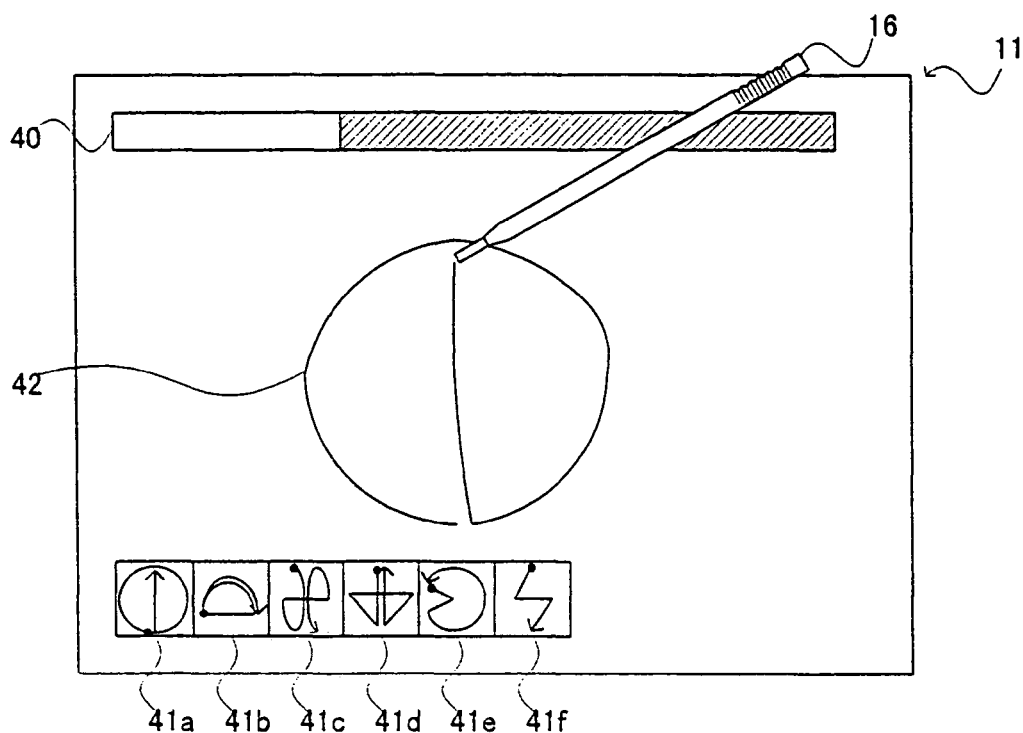
FIG. 5 is an illustration showing a game screen displayed when an input of a graphic is completed.

FIG. 5 is an illustration showing a game screen displayed when the input of one graphic is completed. When the input for the one graphic is completed as shown in FIG. 5, the player temporarily stops the touch input. That is, the player detaches the stick 16 from the touch panel 15. When detecting that the touch input has not been performed for a predetermined period of time (e.g., five frames), the game apparatus 10 determines that the input of the one graphic is completed. Then, the game apparatus 10 determines which reference pattern from among the reference patterns illustrated by the reference pattern icons 41a, 41b, 41c, 41d, 41e, and 41f is inputted, based on a shape of the inputted graphic. In other words, the shape of the input graphic drawn by the player is identified. A detailed process for identifying a shape of an input graphic will be described below.

Figure 6:
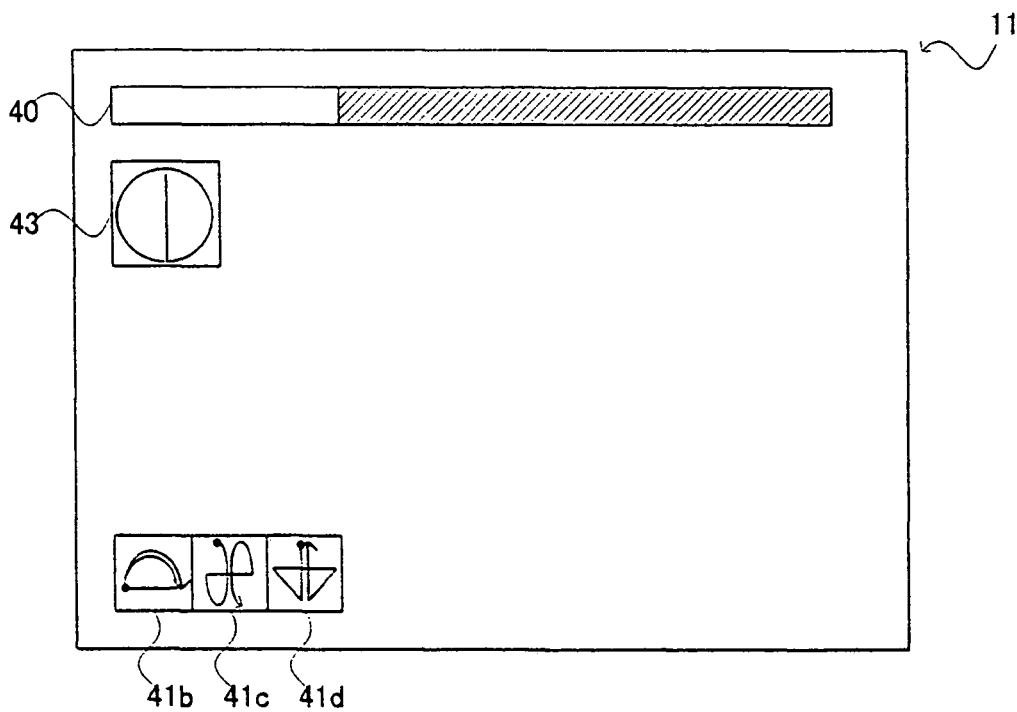
FIG. 6 is an illustration showing a game screen displayed immediately after the completion of the input of the graphic.

FIG. 6 is an illustration showing a game screen displayed immediately after the completion of the input of the one graphic. In FIG. 6, a reference pattern corresponding to the input having been completed is identified, and an icon (having-been-inputted icon) 43 illustrating the identified reference pattern is displayed. In a state as shown in FIG. 6, the trace image 42 drawn by the input having been completed is not displayed (is deleted). Also, here, the number and the type of reference pattern icons to be displayed change. In FIG. 6, among the reference pattern icons 41a, 41b, 41c, 41d, 41e, and 41f, only the reference pattern icons 41b, 41c, and 41d are displayed, and the reference pattern icons 41a, 41e, and 41f are deleted. Therefore, in a state shown in FIG. 6, the player can only input three types of reference patterns illustrated by the reference pattern icons 41b, 41c, and 41d. The player further inputs a graphic as necessary so that a desired magic can be cast. As such, in the present embodiment, a plurality of graphics can be inputted in one magic instruction operation. Also, in one magic instruction operation, the number or the type of reference patterns which can be subsequently inputted change depending on the number or the type of graphics having been inputted.

Also, the player can continue inputting graphics until a time limit is reached (until the shaded portion of the gage 40 has run out). That is, one magic instruction operation can be performed during a time period predetermined by the time limit. Note that, even prior to reaching the time limit, the magic instruction operation may be ended by performing a predetermined operation. As for the predetermined operation, a specific graphic may be drawn by a touch input, or one of switches provided on the game apparatus 10 may be pressed. When the magic instruction operation is ended, the game apparatus 10 determines a magic to cast based on the combination of the one or more reference patterns (reference patterns illustrated by the having-been-inputted icons 43) having been inputted. Then, the game apparatus 10 displays, on the first LCD 11 (or on the second LCD 12), a state in which the player character attacks the enemy character by using the magic having been determined. Thereafter, the player character and the enemy character repeatedly attack each other by taking turns, and the battle scene continues until a hit point of either of the player character or the enemy character becomes zero.

Hereinafter, a process identifying the shape of the input graphic according to the present embodiment will be described. The process is performed for identifying a correspondence between a shape of a trace (input graphic) on an input surface of the touch panel 15 (display screen of the first LCD 11) drawn by the player and one of a plurality of reference patterns which is previously, prepared. Note that, hereinafter, a case in which the player draws a hexagon on the input surface of the touch panel 15 will be described as one example.

Figure 7:
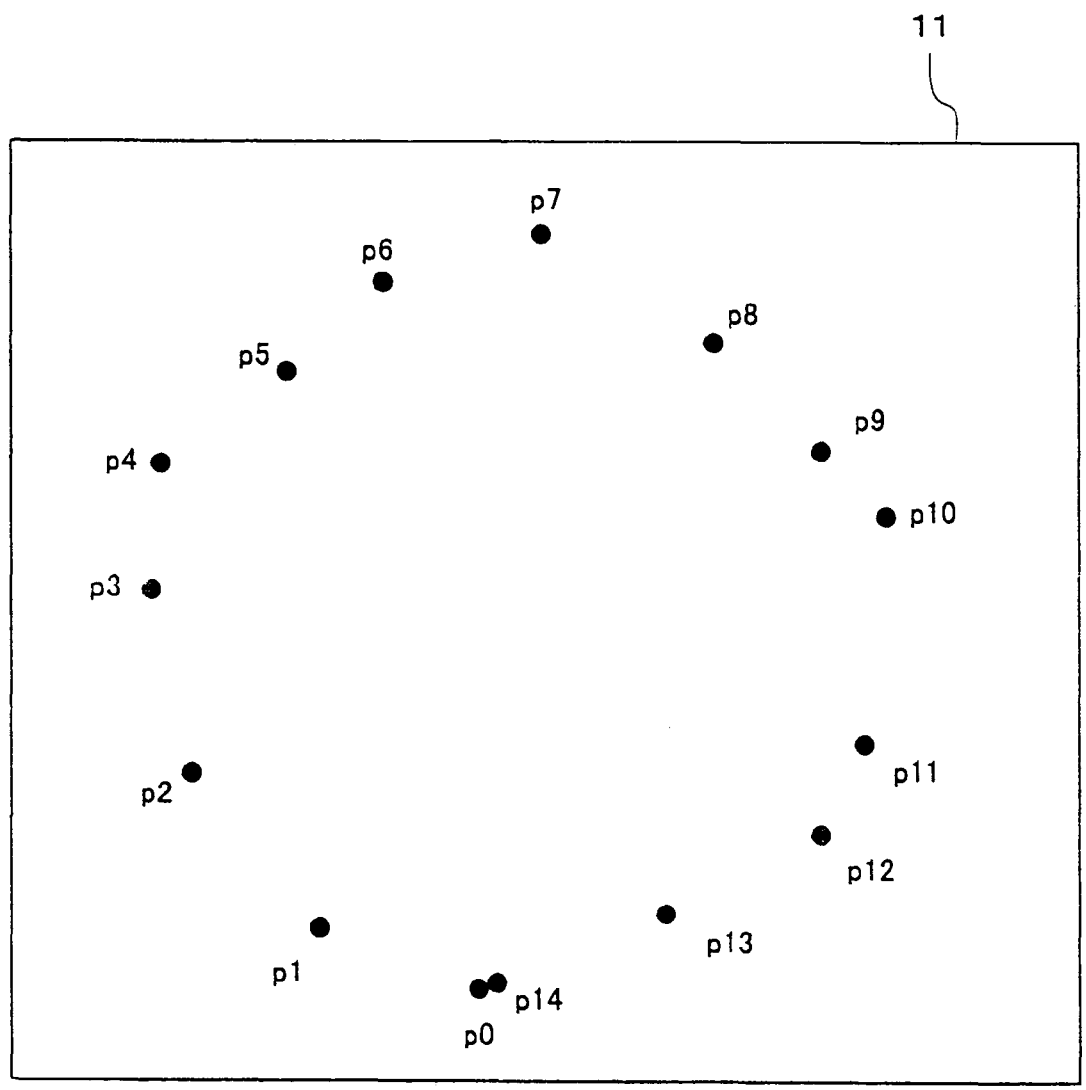
FIG. 7 is an illustration showing one example of an input detected by a touch panel 15.

FIG. 7 is an illustration showing one example of an input detected by the touch panel 15. When the player performs an input for the touch panel 15, the touch panel 15 detects an inputted position at predetermined time intervals in chronological order. The touch panel 15 represents the inputted position by coordinates (X, Y) on a plane whose x- and y-axes respectively correspond to horizontal and vertical directions of the input surface.

Also, a number is assigned to each coordinate point detected by the touch panel 15 in chronological order of input. That is, a number p (j−1) is assigned to a coordinate point detected $j_{th}$ (j is an arbitrary integer equal to or greater than 1). Note that "number assignment" is used for facilitating the understating of the embodiment, and a number is not actually assigned to data. That is, on the computer, data about the detected coordinate point is stored in the order corresponding to the address, for example, of a previously reserved storage area, whereby it is possible to find out the order in which the data is stored. Here, in order to conceptually describe that it is possible to find out the order in which the data is stored, the above-described concept of "number assignment" is used. In FIG. 7, fifteen coordinate points are detected, and numbers from p0 to p14 are assigned thereto in the order in which each point is inputted. A graphic obtained by connecting these coordinate points with a straight line in the order in which each point is inputted is subjected to identification by the game program. Hereinafter, in order to facilitate the understanding of the present embodiment, the graphic obtained by connecting the coordinate points detected by the touch panel 15 with a straight line in chronological order (that is, in the order in which each point is inputted) is referred to as a subject graphic. The subject graphic is composed of a set of coordinate points indicating a trace drawn on the input surface of the touch panel 15. That is, the subject graphic represents a trace inputted by the player by a plurality of line segments in order to identify graphic characteristics of the trace drawn on the input surface of the touch panel 15. Note that the subject graphic is a concept for facilitating the understanding of the descriptions of the present embodiment, and it is represented on the computer merely by coordinate point data and data about a distance between coordinate points, for example.

When a subject graphic is detected by the touch panel 15, a line factor is first extracted from the subject graphic. That is, a process for thinning out the coordinate points composing the subject graphic (a thinning-out process) is performed. The thinning-out process is performed for simplifying a shape of the subject graphic by deleting (in other words, "extracting" or "acquiring") some coordinate points from among the coordinate points detected by the touch panel 15. Hereinafter, the thinning-out process will be described using FIGS. 8A to 8D.

Figure 8A:
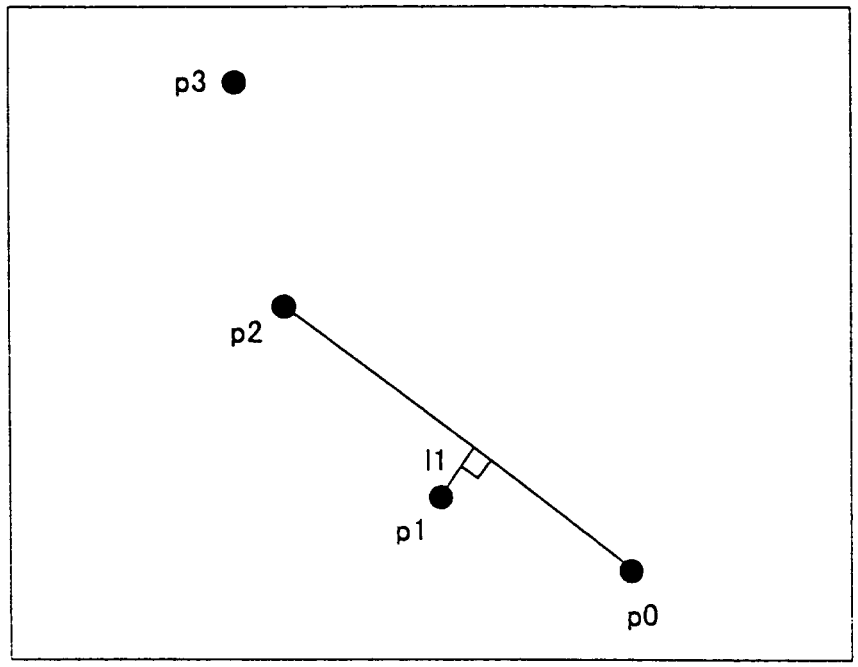
FIG. 8A is an illustration for describing a thinning-out process.

FIGS. 8A to 8D are illustrations for describing the thinning-out process. The thinning-out process is performed for deleting a coordinate point lying within a predetermined distance from a straight line connecting two predetermined coordinate points from among a group of coordinate points detected by the touch panel 15. That is, the thinning-out process is performed by calculating a distance between a straight line, whose endpoints are two coordinate points which are unadjacent to each other and are included in the coordinate points composing the subject graphic, and each coordinate points between the above two coordinate points. Specifically, a straight line whose front side endpoint (front endpoint) is a coordinate point p0, which is a starting point of the subject graphic, and whose back side endpoint (back endpoint), which is a coordinate point p2 (a second point after the coordinate point p0), is first selected. Then, a distance l1 between the selected straight line and a coordinate point between the endpoints of the straight line (i.e., a coordinate point p1) is calculated (see FIG. 8A). Further, it is determined whether or not the calculated distance l1 is greater than a predetermined distance (a margin of error) l'. In FIG. 8A, assume that l1<l'. Also, the predetermined distance l' is an arbitrary value appropriately determined based on a type of a graphic to be identified.

Figure 8B:
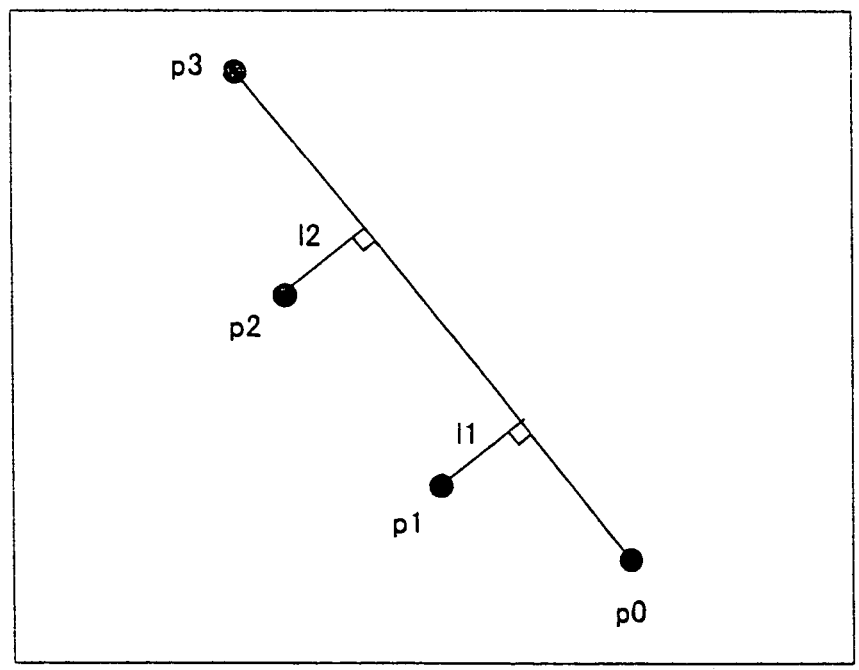
FIG. 8B is an illustration for describing the thinning-out process.

As shown in FIG. 8A, in the case where l1 is equal to or smaller than the predetermined distance l', a new straight line is selected, and a distance between the selected straight line and a coordinate point between the endpoints of the straight line. Specifically, a straight line whose back endpoint is shifted to a following coordinate point is newly selected. In an example as shown in FIG. 8B, a straight line connecting the coordinate point p0 and a coordinate point p3 is selected. Then, a distance between the selected straight line and a coordinate point between the endpoints of the straight line is calculated (see FIG. 8B). In an example as shown in FIG. 8B, a distance between a straight line connecting the coordinate points p0 and p3 and a coordinate point between the endpoints of the straight line (each coordinate point between the coordinate points p0 and p3, i.e., coordinate points p1 and p2) is calculated. That is, a distance l1 between the straight line and the coordinate point p1, and a distance l2 between the straight line and the coordinate point p2 are calculated. When the distance l1 and the distance l2 are calculated, it is determined that either the distance l1 or the distance l2 is greater than the margin of error l'. Here, in the case where both the distance l1 and the distance l2 are equal to or smaller than the margin of error l', a new straight line is selected, and a distance between the selected straight line and a coordinate point is calculated. That is, a distance between a straight line connecting the coordinate point p0 and a coordinate point p4 and each coordinate point between the coordinate point p0 and the coordinate point p4 (i.e., each of the coordinate points p1, p2 and p3) is calculated.

On the other hand, in the case where at least either the distance l1 or the distance l2 is greater than the margin of error l', a process for deleting a coordinate point which has been determined to be equal to or smaller than the predetermined distance l' is performed. Specifically, a coordinate point which follows the front endpoint of the currently selected straight line and is at least a second point before the back endpoint of the selected straight line is deleted. In an example as shown in FIG. 8B, a coordinate point which follows the coordinate point p0 and is at least a second point before the coordinate point p3 (i.e., the coordinate point p1) is deleted (see FIG. 8C).

Figure 8C:
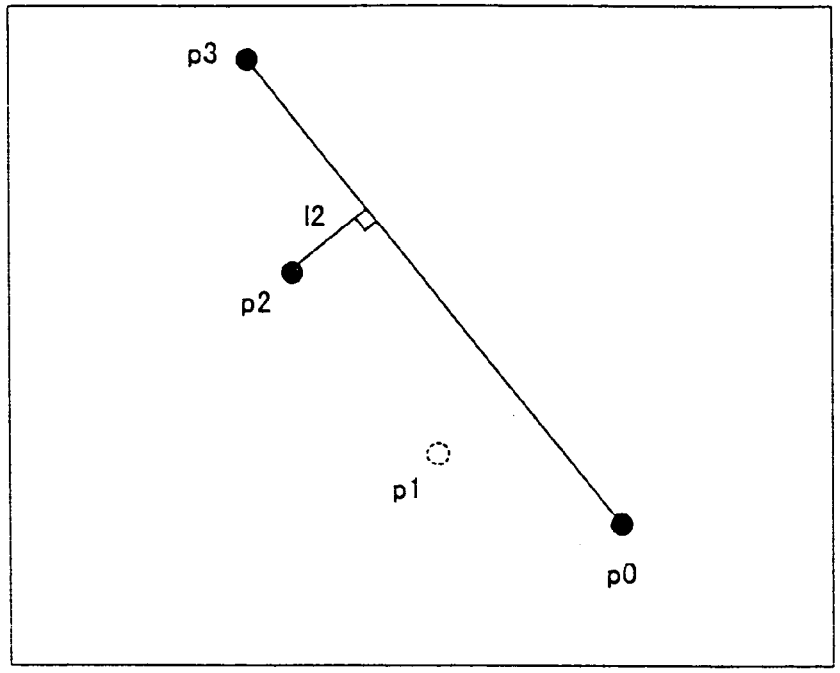
FIG. 8C is an illustration for describing the thinning-out process.
Figure 8D:
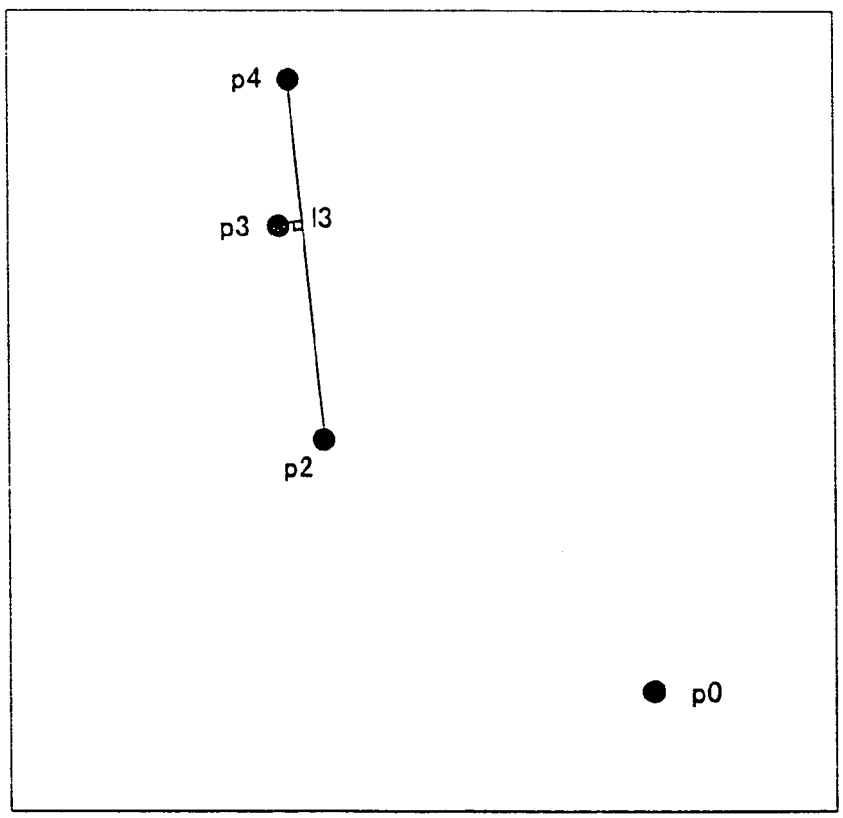
FIG. 8D is an illustration for describing the thinning-out process.

In the case where the coordinate point is deleted as shown in FIG. 8C, a distance between a straight line and a coordinate point is newly calculated. In this case, a straight line whose front endpoint is set to the pre-shifted back endpoint and whose back endpoint is set to two coordinate points after the set front endpoint is selected. Specifically, a straight line connecting the coordinate points p2 and p4 is selected. Then, a distance l3 from the straight line to the coordinate point p3 is calculated (see FIG. 8D). Hereinafter, a process for selecting a straight line and calculating a distance between a coordinate point and the selected straight line, and a process for determining whether or not the calculated distance is greater than a predetermined distance are repeated. In the case where the calculated distance is greater than the predetermined distance, a process for deleting a coordinate point which has been determined to be equal to or smaller than the predetermined distance l' is performed. These processes are performed until a straight line whose back endpoint is set to a coordinate point p14, which is an ending point of the subject graphic, has been selected.

Figure 9:
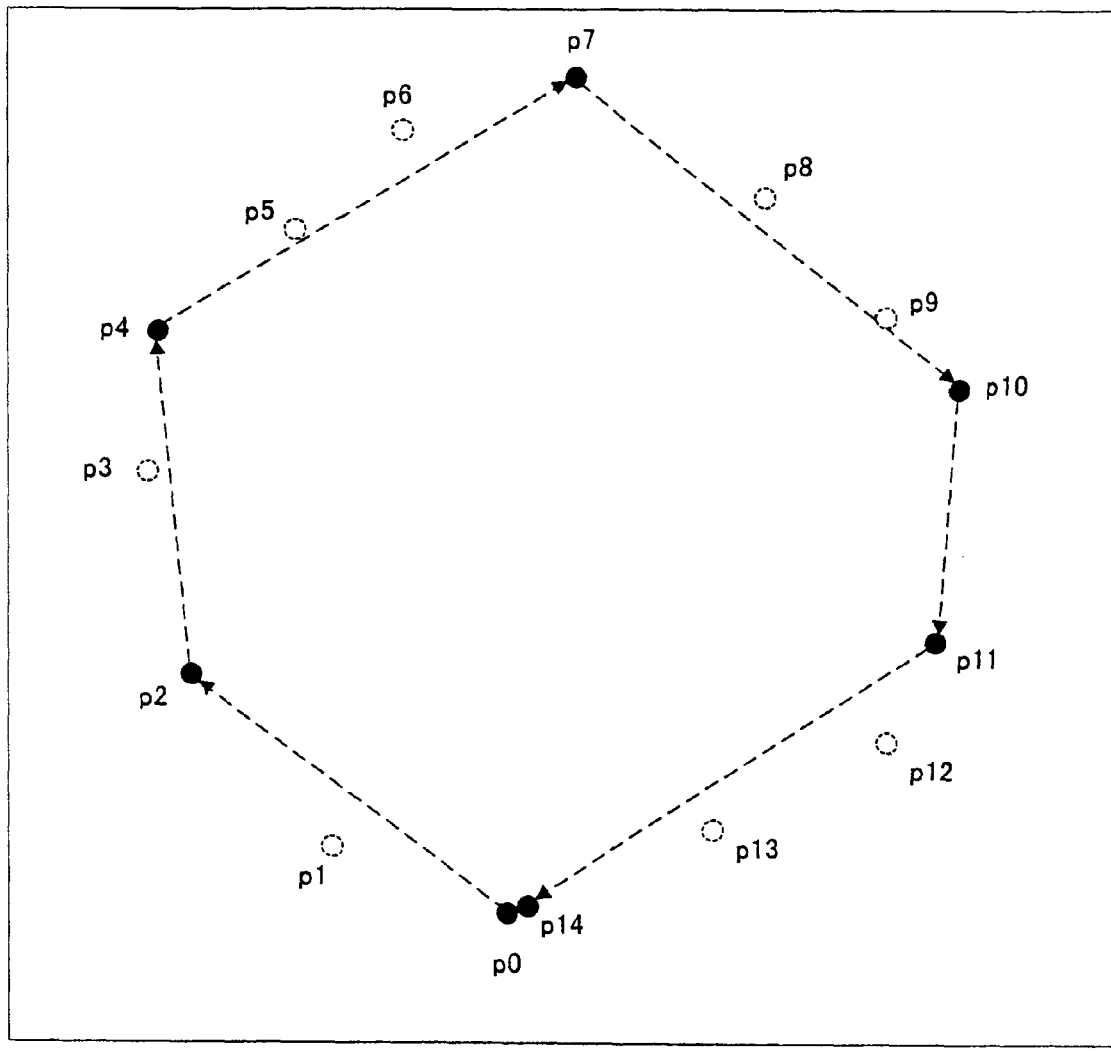
FIG. 9 is an illustration showing before and after states of the thinning-out process.

FIG. 9 is an illustration showing before and after states of the thinning-out process. As shown in FIG. 9, as a result of execution of the thinning-out process as shown in FIGS. 8A to 8D, coordinate points p1, p3, p5, p6, p8, p9, p12, and p13 are deleted. As such, the number of coordinate points composing the subject graphic is changed to seven by the thinning-out process, the number of line segments (coordinate points) composing the subject graphic is reduced, whereby a shape of the subject graphic is simplified. Note that, in the present embodiment, each straight line composing the subject graphic is referred to as a side of the subject graphic. Also, a coordinate point composing the subject graphic is referred to as a vertex of the subject graphic. Note that, in the present embodiment, it is assumed that the thinning-out process is performed by a method as shown in FIGS. 8A to 8D, but any algorithm may be used for thinning out the coordinate points composing the subject graphic. Note that it is possible to simplify a subsequent process by reducing the number of coordinate points as shown in FIG. 8. In the present invention, however, all detected coordinate points may be set to vertices of the graphic.

Figures 10A, 10B:
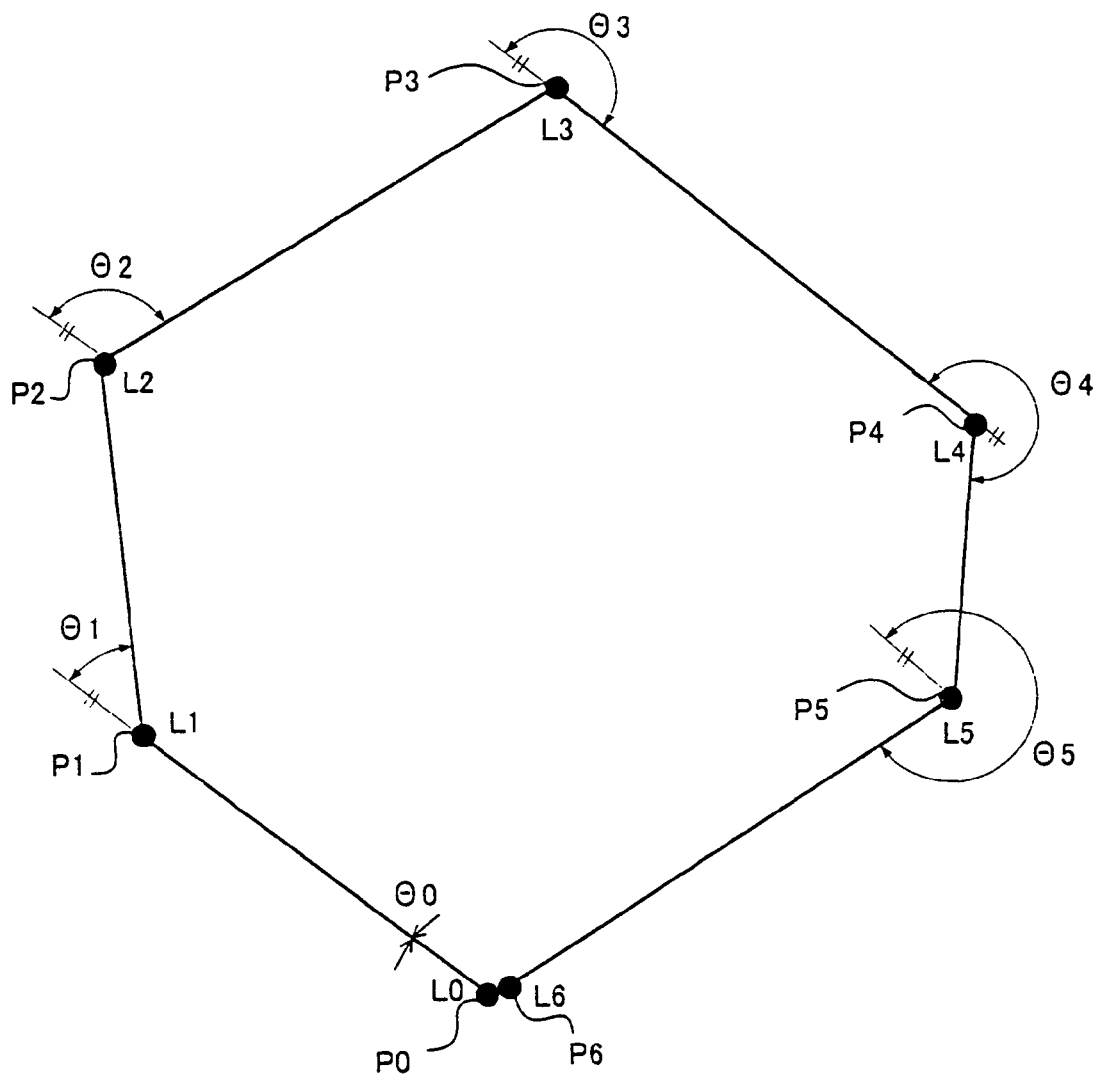
FIG. 10A is an illustration showing a subject graphic simplified by the thinning-out process.
FIG. 10B is an illustration showing graphical information of the subject graphic shown in FIG. 10A.

FIG. 10A is an illustration showing the subject graphic simplified by the thinning-out process. In FIG. 10A, vertices left after the thinning-out process are assigned new vertex numbers P0 to P6, respectively. When the subject graphic is simplified by the thinning out process, graphical information of the simplified graphic is calculated. The graphical information includes a line segment distance of each vertex of the graphic and an absolute angle of each side. The line segment distance corresponds to a distance from a starting point of the subject graphic to each vertex along a line of the graphic. For example, in an example as shown in FIG. 10A, a line segment distance L2 of the vertex P2 corresponds to the sum of a distance of a straight line connecting the vertex P0 and the vertex P1 and a distance of a straight line connecting the vertex P1 and the vertex P2. Also, a line segment distance L0 of the vertex P0, which is a starting point of the subject graphic, is 0 (L0=0).

Also, the absolute angle corresponds to an angle of each side (line segment) of the subject graphic with respect to a predetermined reference straight line. In the present embodiment, assume that the reference straight line is a side including a starting point of the subject graphic (that is, a line segment connecting the vertex P0 and the vertex P1). That is, the absolute angle, is based on angle (i.e., assuming that it is 0) of a side including a starting point of the subject graphic (a reference angle, which will be described below). In an example as shown in FIG. 10A, an absolute angle of each of the sides of P0-P1, P1-P2, P2-P3, P3-P4, P4-P5, and P5-P6 is first calculated with respect to a side connecting the vertex P0, which is a starting point of a trace, and the vertex P1. For example, an absolute angle Θ1 of a side connecting the vertex P1 and the vertex P2 corresponds to an angle which the above side forms with a side including a starting point of the subject graphic (that is, a side connecting the vertex P0 and the vertex P1). Also, an absolute angle is calculated with respect to a side connecting the vertex P0 and the vertex P1, whereby an absolute angle of this side is 0 (Θ0=0). As such, the game apparatus 10 calculates a line segment distance of each vertex of the subject graphic, and calculates an absolute angle of each side, thereby calculating graphical information of a trace for a trace graph in which an x-axis of orthogonal coordinates indicates a length from a starting point along each side, and a y-axis indicates an absolute angle.

FIG. 10B is an illustration showing one example of graphical information. Note that the graphical in formation as shown in FIG. 10B is graphical information of the subject graphic as shown in FIG. 10A. As shown in FIG. 10B, the graphical information includes a line segment distance Ln at a vertex Pn of the subject graphic and an absolute angle Θn of a side connecting the vertex Pn and a vertex Pn+1. Note that a value of Θ6 does not exist since there is no side in the case of n=6.

When the above graphical information is calculated, comparison between the subject graphic and the reference pattern is performed. The reference pattern is represented by graphical information of the reference pattern which is previously prepared for graphics identification in the game program. Here, as is the case with the above-described trace graph, the graphical information is data in which an x-axis of orthogonal coordinates indicates a length from a starting point along each side and a y-axis indicates an absolute angle. The game program includes data indicating a plurality of types of reference patterns, and the game apparatus 10 identifies a coincidence between a trace drawn by the player on the input surface of the touch panel 15 and one of the plurality of reference patterns. Note that the game program includes the above graphical information as data indicating the reference pattern. Comparison between the subject graphic and the reference pattern is performed using the graphical information. That is, the game apparatus 10 calculates a degree of similarity between the subject graphic and each reference pattern using the line segment distance and the absolute angle. The game apparatus 10 identifies a shape of the subject graphic by using the calculated degree of similarity.

Figure 11:
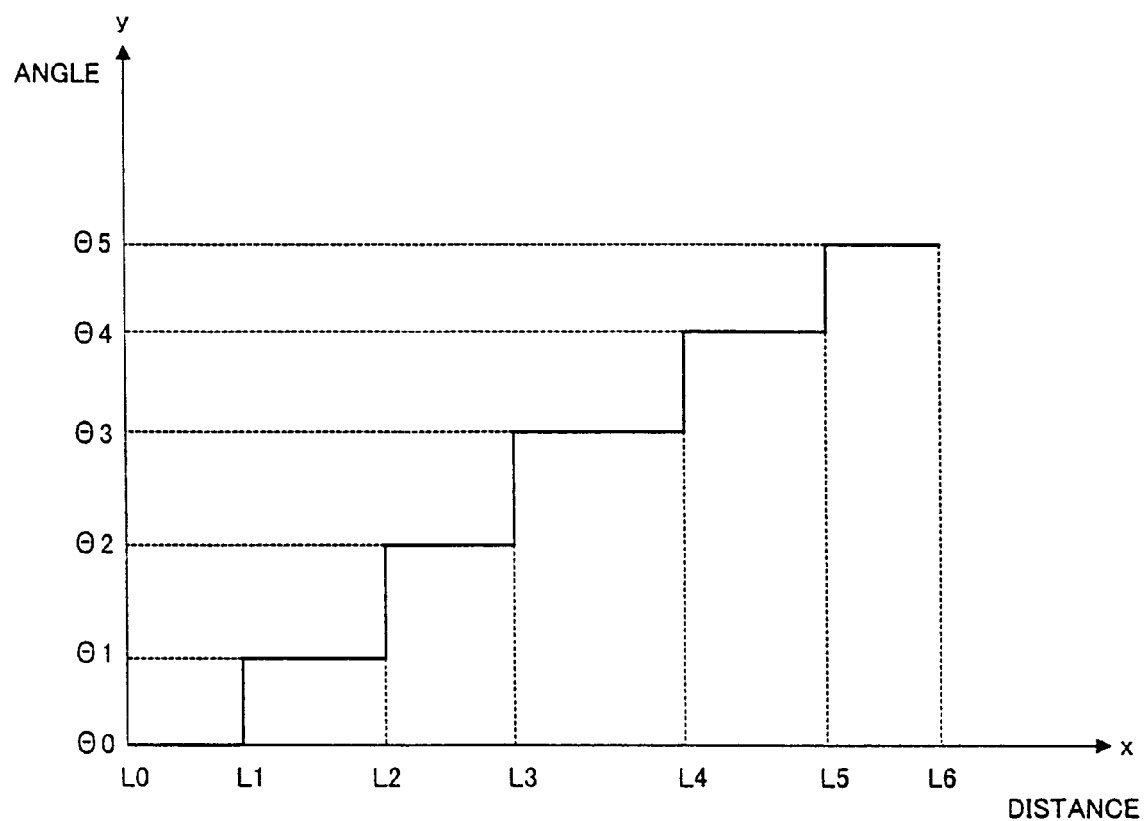
FIG. 11 is an illustration showing one example of a trace graph.

In the present embodiment, comparison between the subject graphic and the reference pattern is performed using a step graph in the orthogonal coordinate system whose axes represent the above line segment distance and the absolute angle. FIG. 11 is an illustration showing one example of a step graph (trace graph) representing the subject graphic. In a coordinate plane as shown in FIG. 11, an x-axis indicates a line segment distance and a y-axis indicates an absolute angle. The trace graph as shown in FIG. 11 indicates characteristics of the subject graphic as shown in FIG. 10A. Specifically, a line segment connecting the vertex P0 and the vertex P1 as shown in FIG. 10A corresponds to a line segment x=L0–L1 as shown in FIG. 11. The graph as shown in FIG. 11 indicates that a length of a side leading from a starting point (x=L0) to a coordinate x=L1 is L1-L0 and an absolute angle thereof is y=Θ0 (=0). Also, the graph as shown in FIG. 11 indicates a length of a side leading from a vertex (vertex P1) whose distance from the starting point is L1 to a vertex (vertex P2) whose distance from the starting point is L2 is L2–L1 and an absolute angle thereof is y=Θ1. As shown in FIG. 11, it is possible to represent characteristics of the subject graphic by the trace graph.

Figures 12A, 12B:
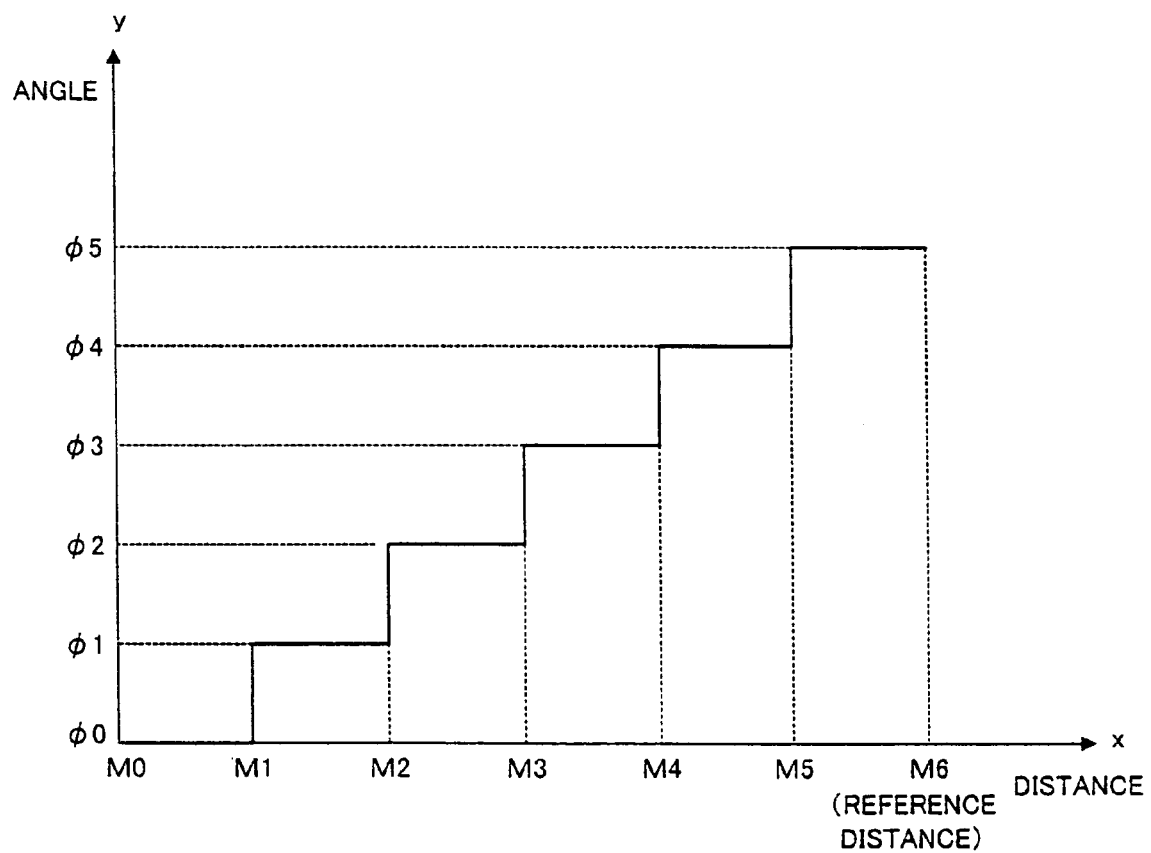
FIG. 12A is an illustration showing graphical information of a reference pattern.
FIG. 12B is an illustration showing a step graph representing the reference pattern.

On the other hand, as is the case with the subject graphic, it is possible to represent a reference pattern as a graph in the orthogonal coordinate system whose axes are a line segment distance and an absolute angle. FIGS. 12A and 12B are illustrations showing one example of graphical information of a reference pattern and a step graph (reference pattern graph) of the reference pattern, respectively. FIG. 12 is an illustration showing graphical information of the reference pattern. Note that the graphical information as shown in FIG. 12A represents a line segment distance Mm of each vertex Qm (m=1 to 6) of the reference pattern and an absolute angle φm of a side connecting the vertex Qm and a vertex Qm+1. As is evident from the graphical information, the reference pattern as shown FIG. 12A is a regular hexagon, each side having the same length (60). Also, the reference pattern graph as shown in FIG. 12B represents characteristics of the reference pattern indicated by the graphical information as shown in FIG. 12A.

Note that the graphical information of each reference pattern is previously prepared so that a line segment distance of an ending point of the reference pattern becomes a predetermined reference distance. That is, a line segment distance of an ending point of each reference pattern is previously adjusted so as to be the same. As shown in FIG. 12B, as is the case with the subject graphic, it is possible to represent characteristics of the reference pattern by calculating a line segment distance and an absolute angle.

Figure 13:
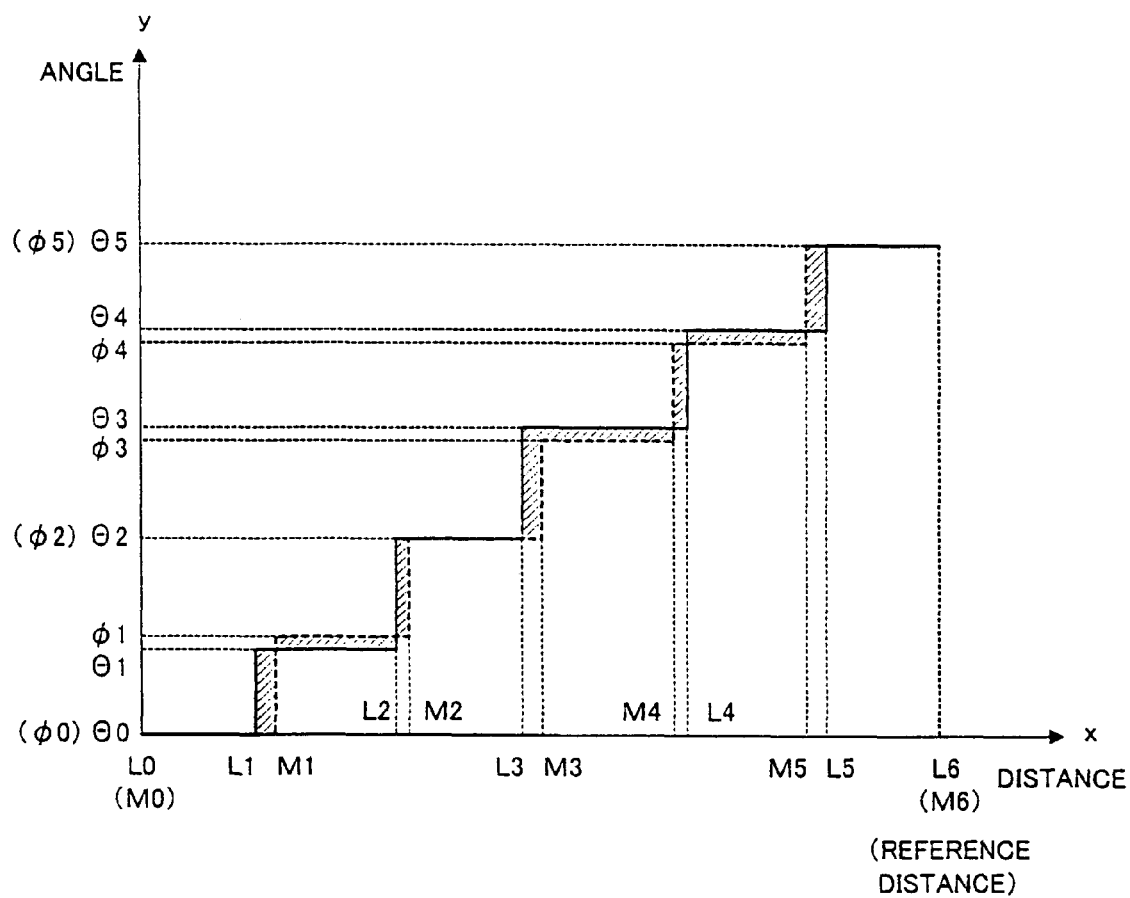
FIG. 13 is an illustration for describing a process for comparing the subject graphic with the reference pattern.

Comparison between the subject graphic and the reference pattern is performed by comparing the trace graph and the reference pattern graph. FIG. 13 is an illustration for describing a process for comparing the subject graphic with the reference pattern. FIG. 13 is an illustration generated by superimposing the trace graph as shown in FIG. 11 on the reference pattern graph as shown in FIG. 12B. In the case where the trace graph is superimposed on the reference pattern graph, the game apparatus 10 calculates the area of portions (shaded portions as shown in FIG. 13) each of which is surrounded by line segments which are not shared by the trace graph and the reference pattern graph. Note that, hereinafter, the above area is referred to as a difference area. In the present embodiment, the calculated difference area is used as a degree of similarity. That is, in the case where the trace graph and the reference pattern graph are similar in shape, the difference area is reduced, whereby it is possible to determine that there is a high degree of similarity between the two graphs. On the contrary, in the case where the trace graph is completely different from the reference pattern graph in shape, the difference area is increased, whereby it is possible to determine that there is a low degree of similarity between the two graphs. The game apparatus 10 calculates a difference area with respect to each reference pattern, and identifies a shape of the subject graphic by using the calculated difference area.

Note that, when the trace graph is superimposed on the reference pattern graph, a cumulative length of the subject graphic is normalized so that a cumulative length of the trace graph is equal to a cumulative length of the reference pattern. Here, the cumulative length is a total sum of lengths of the line segments composing a graphic, that is, a line segment distance of an ending point of the graphic. In the examples as shown in FIGS. 11 to 13, the cumulative length is normalized so that the cumulative length (line segment distance L5) of the line segments composing the subject graphic becomes 360. As a result, it is possible to perform graphics identification regardless of the size of the trace inputted by the player.

As such, according to the present embodiment, graphical information (a line segment distance and an absolute angle) of the subject graphic and the reference pattern is calculated. Then, a degree of similarity between the subject graphic and the reference pattern is calculated by using a trace graph and a reference pattern graph, which are generated based on the calculated graphical information. That is, a degree of similarity between the subject graphic and the reference pattern is the area (difference area) of portions which are not shared by the graphs each indicating the corresponding graphic. As a result, a degree of similarity between the subject graphic and the reference pattern is determined in view of various factors such as an angle of each side, a line segment distance of each vertex, the number of vertices, a length of each side, and an input order of each side.

Here, in the case where identification of a complicated graphic is performed, the number of vertices of the subject graphic may differ from the number of vertices of the reference pattern due to false detection by the touch panel 15 or incorrect input by the player, for example. Also, there may be a possibility that some algorithms of the thinning-out process cannot calculate the number of vertices of the subject graphic with accuracy. Note that, in the conventional method for calculating a degree or similarity between the subject graphic and the reference pattern, the number of vertices of the subject graphic and that of the reference pattern are calculated, and then a degree of similarity is calculated based on the obtained number of vertices. However, according to the method, it may be determined that a degree of similarity is low if the subject graphic and the reference pattern are different in the number of vertices. Thus, it is impossible to identify a shape of the subject graphic of complicated shares by the above-described method. On the other hand, according to the present embodiment, various factors are considered in order to determine a degree of similarity between the subject graphic and the reference pattern. As a result, a degree of similarity does not substantially change depending only on the number of vertices of the subject graphic. Thus, even if the subject graphic and the reference pattern are different in the number of vertices, it is possible to identify a shape of the subject graphic with accuracy.

Figure 14:
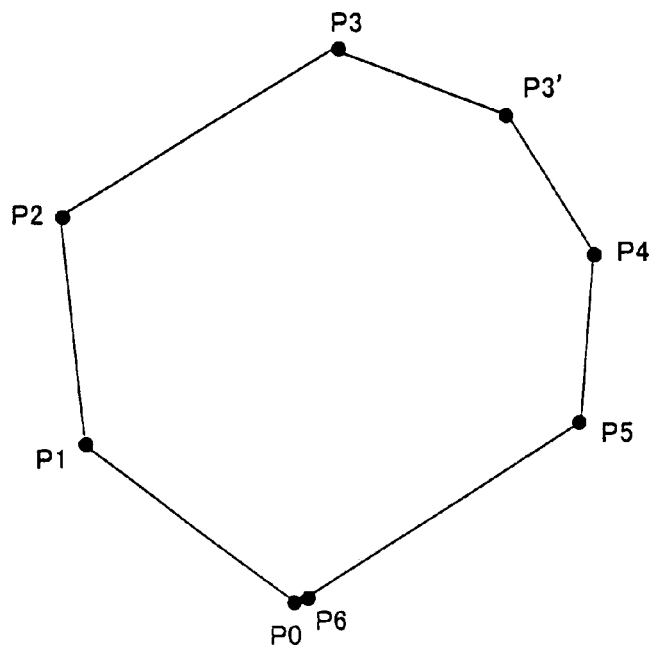
FIG. 14 is an illustration showing one example of a subject graphic in a case where the subject graphic and the reference pattern are different in the number of vertices.
Figure 15:
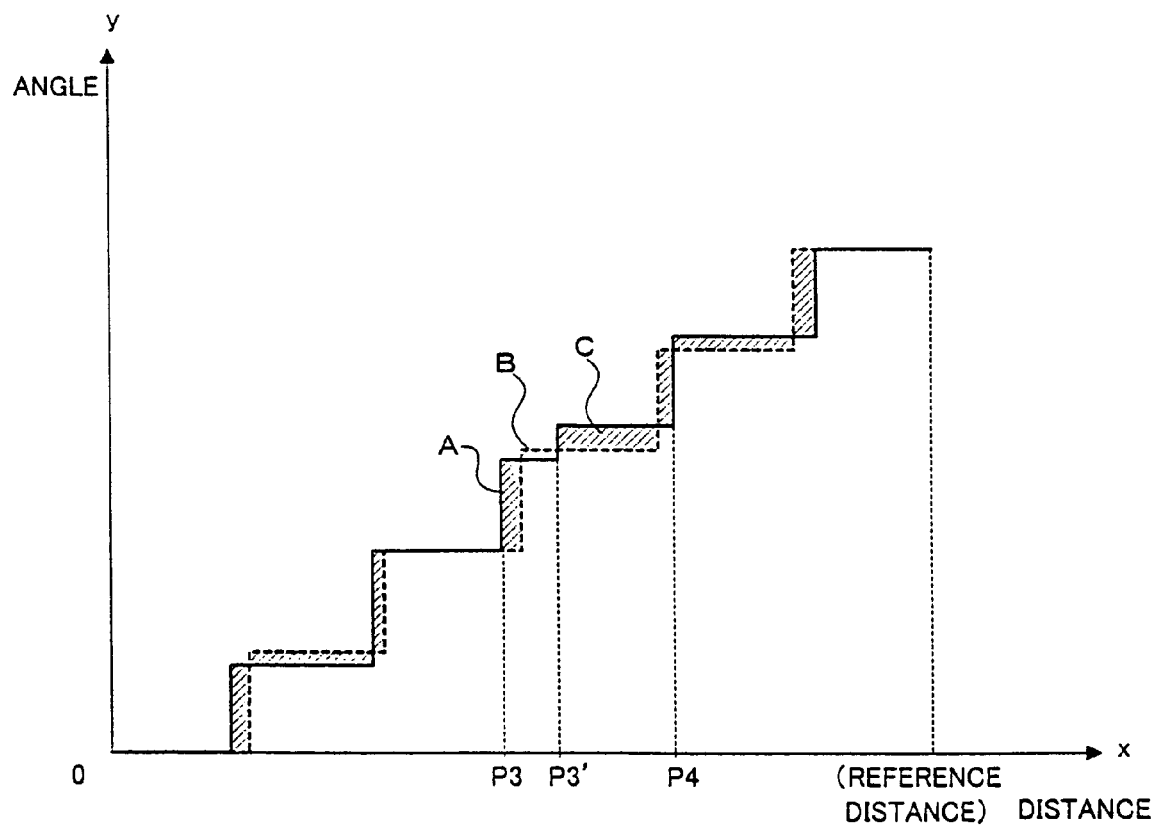
FIG. 15 is an illustration showing a graph of the subject graphic shown in FIG. 14 and a reference pattern graph.

FIG. 14 is an illustration showing one example of a subject graphic in a case where the subject graphic and a reference pattern are different in the number of vertices. The subject graphic as shown in FIG. 14 has a vertex P3' between the vertex P3 and the vertex P4 in addition to the vertices of the subject graphic as shown in FIG. 10A. In the case where the subject graphic is a graphic as shown in FIG. 14, by the conventional method by which a degree of similarity between the subject graphic and the reference pattern is determined by using the number of vertices, it is determined that the number or vertices is seven due to detection of the vertex P3'. As a result, there is a possibility that the subject graphic cannot be appropriately identified to be a hexagon. On the other hand, FIG. 15 is an illustration showing a graph of the subject graphic as shown in FIG. 14 and a reference pattern graph. According to the present embodiment, shaded portions A, B, and C as shown in FIG. 15 appear as a result of detection of the vertex P3'. However, the entirety of the difference area (total area of the shaded portions) does not substantially change by the above shaded portions A to C. That is, the difference area as shown in FIG. 13 is substantially the same as the difference area as shown in FIG. 15. Thus, it is determined that the subject graphic as shown in FIG. 14 has substantially the same degree of similarity as the subject graphic as shown in FIG. 10A. As a result, it is appropriately determined that the subject graphic as shown in FIG. 14 is a hexagon.

Figure 16:
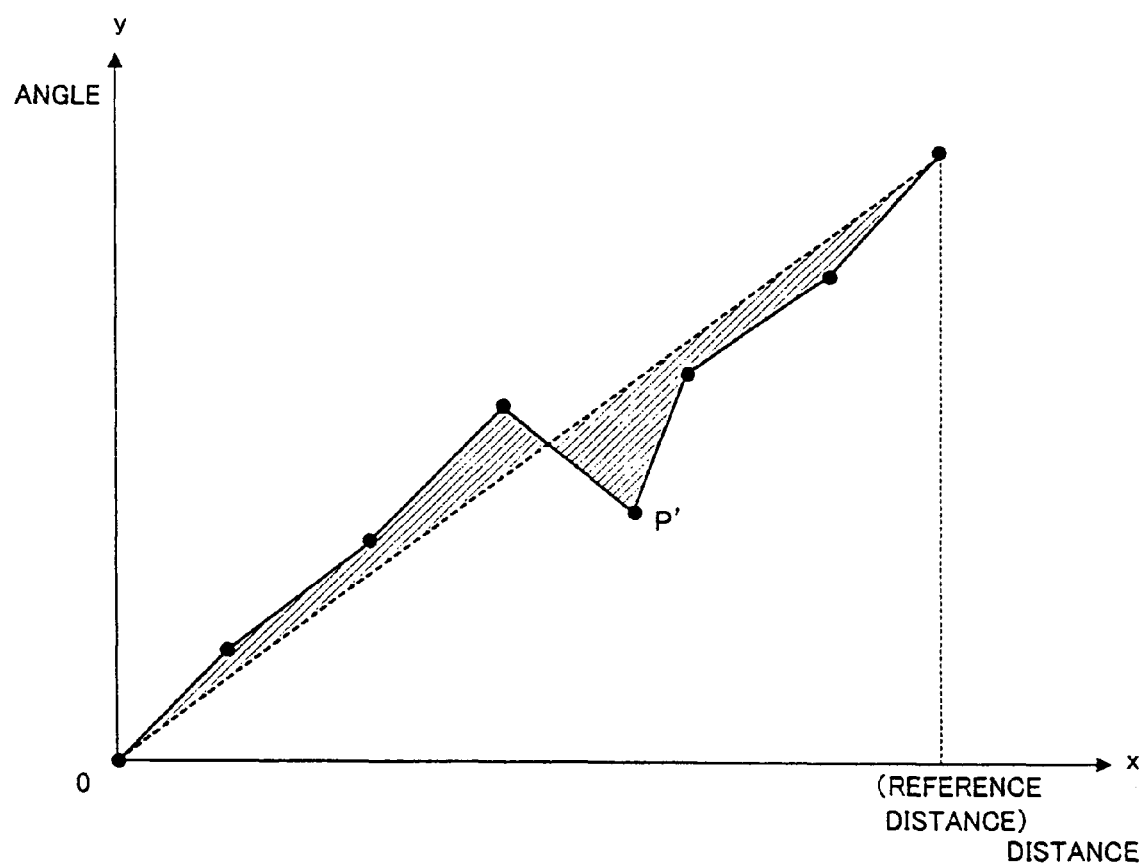
FIG. 16 is an illustration showing one example of a line graph representing a reference pattern and a subject graphic.

Note that, as a method for calculating a difference area, there may be a method using a line graph in which each vertex is connected by a straight line. FIG. 16 is an illustration showing one example of a line graph representing a reference pattern and a subject graphic. By using the line graph as shown in FIG. 16, it is possible to calculate a difference area (shaded portions as shown in FIG. 16). However, in the case where the line graph is used, the calculation amount for calculating a difference area is increased compared to a case in which a step graph is used. Also, a length of each line of the subject graphic and the reference pattern is not considered in the line graph. As a result, the line graph is easily influenced by noise due to false detection by the touch panel 15 and incorrect input by the player, etc. For example, in the case where a vertex (a vertex P' as shown in FIG. 16) which is substantially different from the reference pattern is detected, the line graph is substantially influenced by this vertex. Further, the number of vertices of the subject graphic and the reference pattern is not considered in the line graph, whereby it is difficult to differentiate among a regular triangle, a square, and a regular hexagon, for example. On the other hand, by using the step graph as in the resent embodiment, the number of vertices and a length of each side of the reference pattern are considered for determining a degree of similarity, whereby it is possible to identify a graphic with higher accuracy.

Figure 17A:
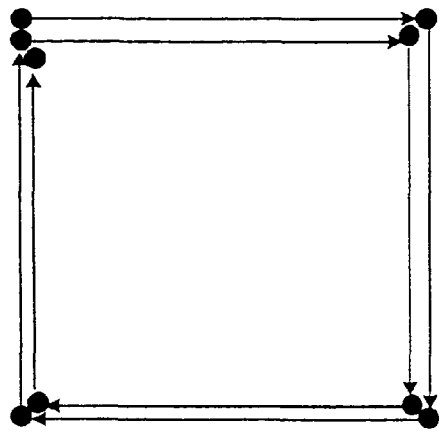
FIG. 17A is an illustration showing another example of a reference pattern.
Figure 17B:
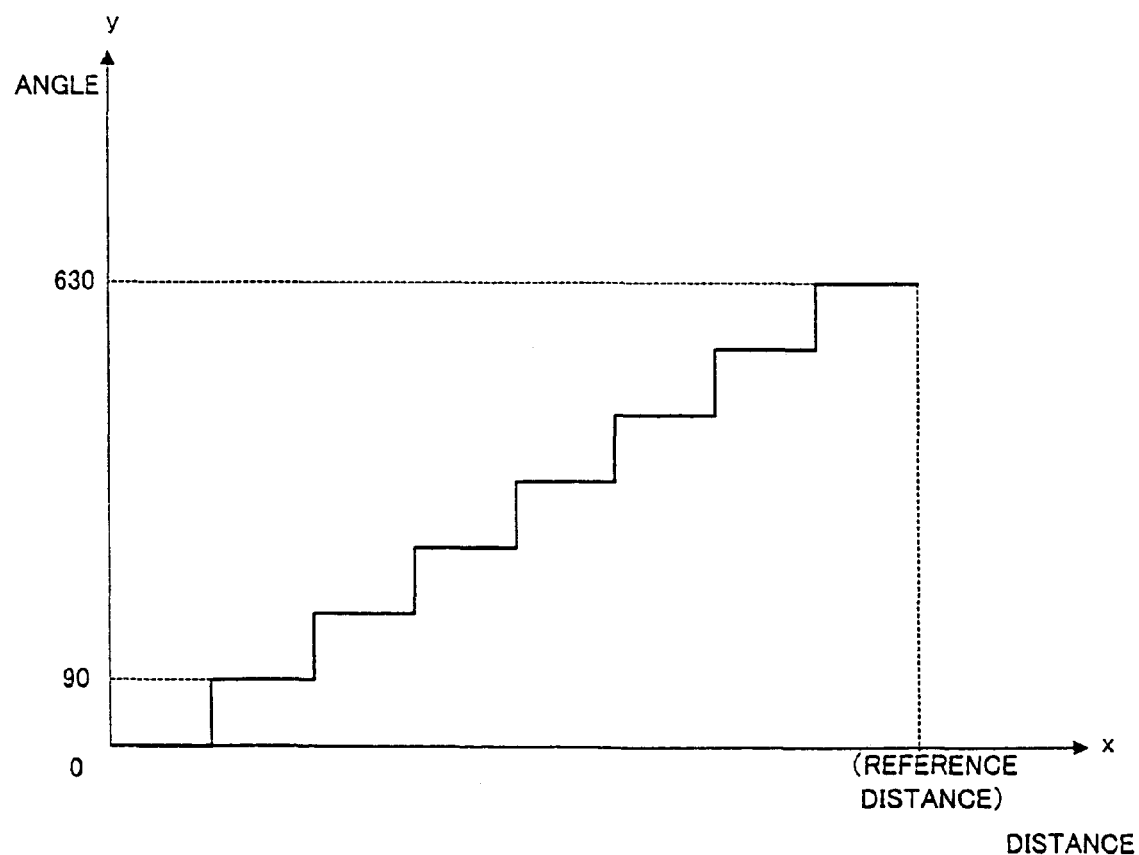
FIG. 17B is an illustration showing a graph representing the reference pattern shown in FIG. 17A.
Figure 18A:
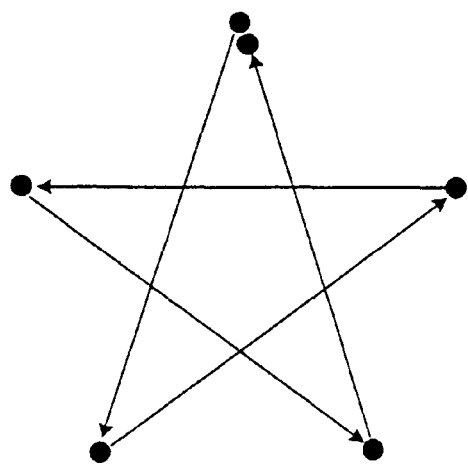
FIG. 18A is an illustration showing another example of a reference pattern.
Figure 18B:
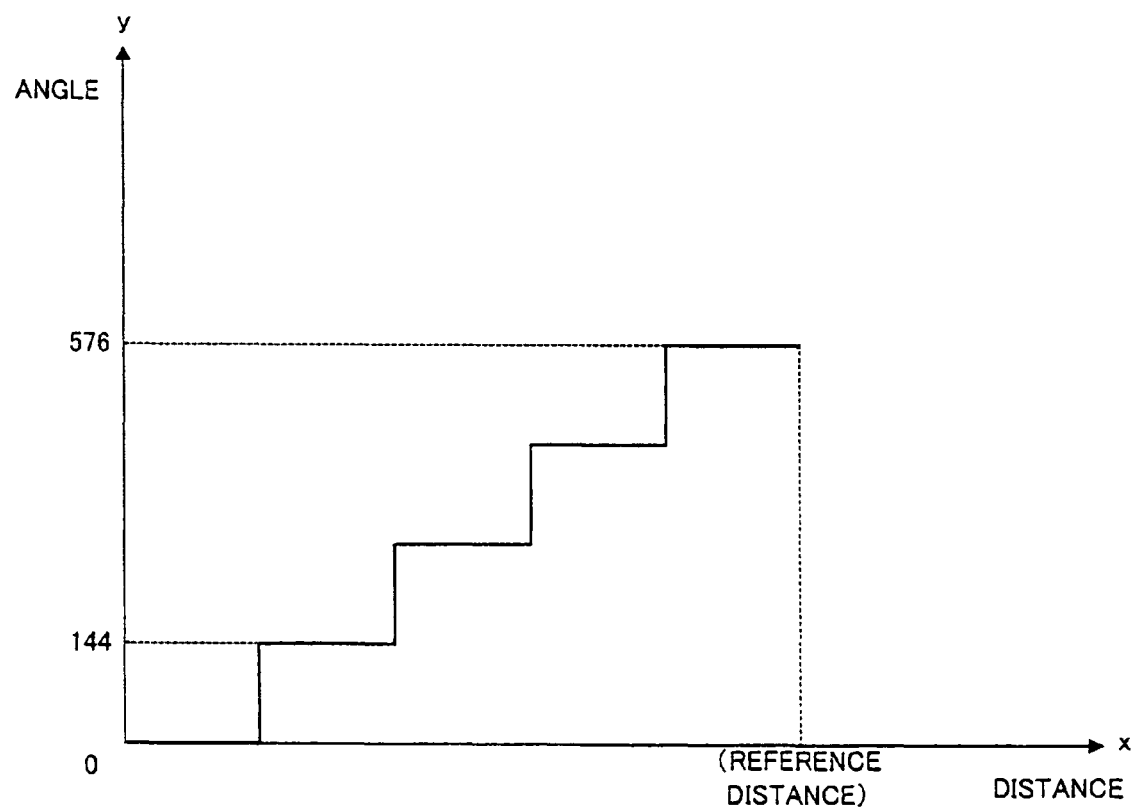
FIG. 18B is an illustration showing a graph representing the reference pattern shown in FIG. 18A.
Figure 19A:
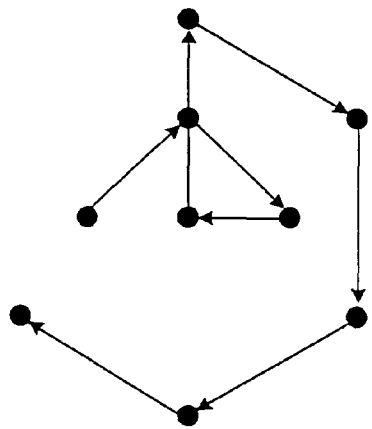
FIG. 19A is an illustration showing another example of a reference pattern.
Figure 19B:
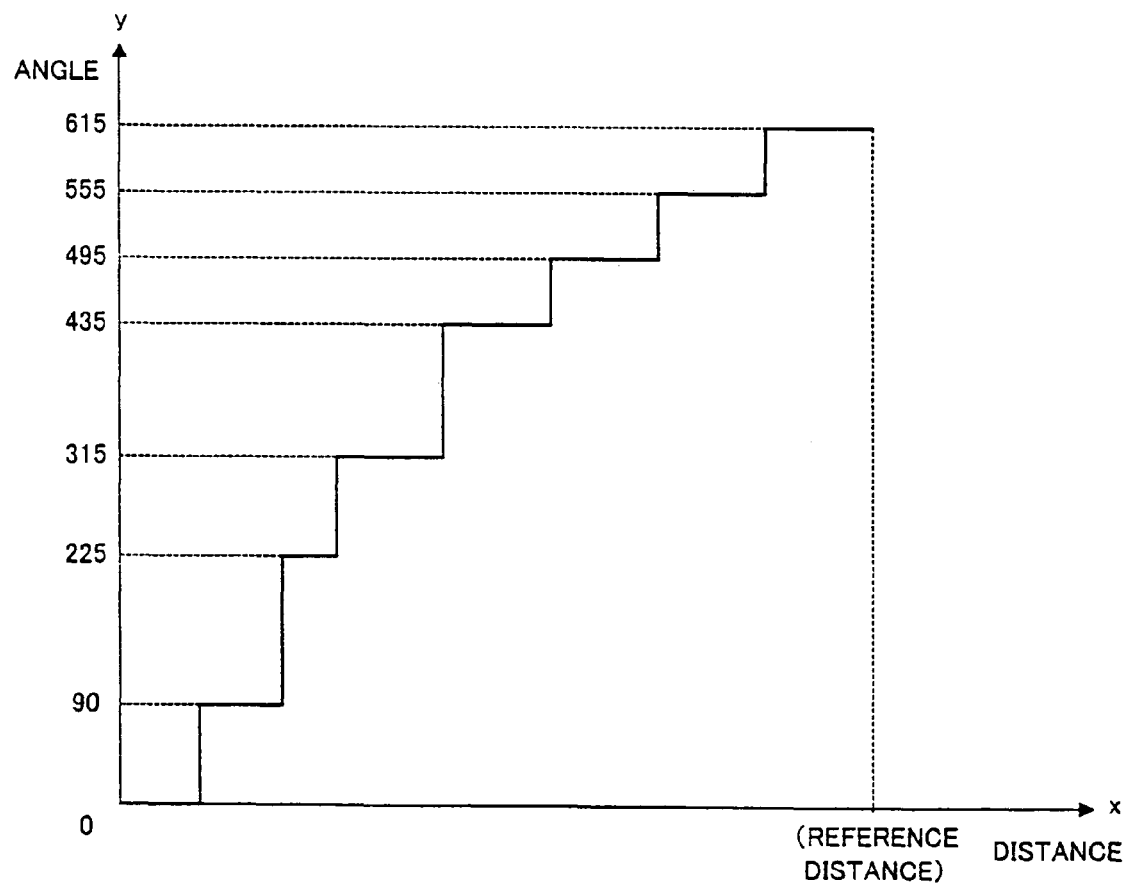
FIG. 19B is an illustration showing a graph representing the reference pattern shown in FIG. 19A.

Note that, in the above descriptions, a case in which the reference pattern is a hexagon has been described, but it is possible to handle a case in which a more complicated reference pattern is used by utilizing a step graph. FIGS. 17A, 17B, 18A, 18B, 19A, and 19B are illustrations each showing another example of a reference pattern. According to the present embodiment, it is possible to appropriately represent characteristics of a reference pattern which is a double-framed square as shown in FIG. 17A by utilizing the step graph (see FIG. 17B). Also, by utilizing the step graph, it is possible to appropriately represent characteristics of a star-shaped graphic as shown in FIG. 18A and a complicated graphic as shown in FIG. 19A (see FIGS. 18B and 19B). Thus, even if the player draws the reference patterns as shown in FIGS. 17A, 17B, 18A, 18B, 19A, and 19B, it is possible to appropriately identify a shape of the trace drawn by the player.

Here, in the present embodiment, a reference value is set to each of the reference patterns. The game apparatus 10 identifies a shape of a subject graphic by using the difference area and the reference value. Specifically, the game apparatus 10 calculates the difference area between each of the reference patterns and the subject graphic, and subtracts a value of the difference area from the reference value of each reference pattern. Then, a shape of a reference pattern having a maximum value obtained by the subtraction is determined as the shape of the subject graphic. This will be described by using reference patterns such as a reference pattern A, a reference pattern B, and a reference pattern C, for example. In this example, assume that the difference area between a subject graphic and the reference pattern A is 40, the difference area between the subject graphic and the reference pattern B is 30, and the difference area between the subject graphic and the reference pattern A is 100. Also, assume that the reference value of the reference pattern A is 50, the reference value of the reference pattern B is 30, and the reference value of the reference pattern C is 40. In this example, the value obtained by subtracting the difference area from the reference value is 10 for the reference pattern A, 0 for the reference pattern B, and −60 for the reference pattern C. In the conventional method, the reference pattern B having the smallest degree of similarity (difference area) is determined as being most similar to the subject graphic, and a shape of the subject graphic is identified as a shape of the reference pattern B. On the other hand, in the present embodiment, the reference pattern A having the largest subtraction value is selected, and the shape of the subject graphic is identified as a shape of the reference pattern A. Therefore, it can be said that, in the present embodiment, the higher the reference value set to a reference pattern, the easier it becomes to successfully input the reference pattern.

As described above, the present embodiment employs a reference value in order to identify a shape of a subject graphic. Accordingly, even with a reference pattern having a larger difference value compare to that of the other reference patterns, it is possible to identify the reference pattern as having the shape of the subject graphic. For example, for a reference pattern possibly difficult to input compare to other reference patterns, a reference value thereof is set higher than that of the other reference patterns. Accordingly, it is easier to determine that the reference pattern is appropriately inputted.

That is, a level of difficulty in input or the reference pattern can be decreased. Also, for a reference pattern for casting a powerful magic, a reference value thereof may be set smaller than that of the other reference patterns. By doing so, accuracy in input of the reference pattern is critically demanded. Consequently, when a difficult input is successfully performed, a powerful magic is cast, so that it is possible to provide a came allowing a player to effectively use his/her operation skill in playing the game and requiring an excellent strategy.

Also, in the present embodiment, when inputting a plurality of graphics in one magic instruction operation, a reference value of each of the reference patterns changes according to the number of graphics having already been inputted. That is, in one magic instruction operation, a reference value of each off the reference patterns is set differently from a case where no graphic has been inputted to a case where at least one graphic has been inputted. Specifically, as the number of graphics having been inputted increases, the game apparatus 10 sets a higher value to a reference value of each of the reference patterns. In the present embodiment, a time limit for one magic instruction operation is provided. Therefore, as the number of graphics inputted by the player increases, the amount of time period left for the magic instruction operation decreases. When the amount of time period for the magic instruction operation decreases, it is conceivable that the player feels pressured, so that an accurate input becomes difficult to be performed. Therefore, in the present embodiment, a reference value is set to be high as the number of graphics having been inputted increases, so that a level of accuracy required for the input is decreased. As such, when the player feels pressured due to not having a sufficient time period for an input and thereby performs an input less accurate than intended, the player can successfully input an intended graphic, whereby a game with an excellent controllability for a player can be provided.

Figure 20:
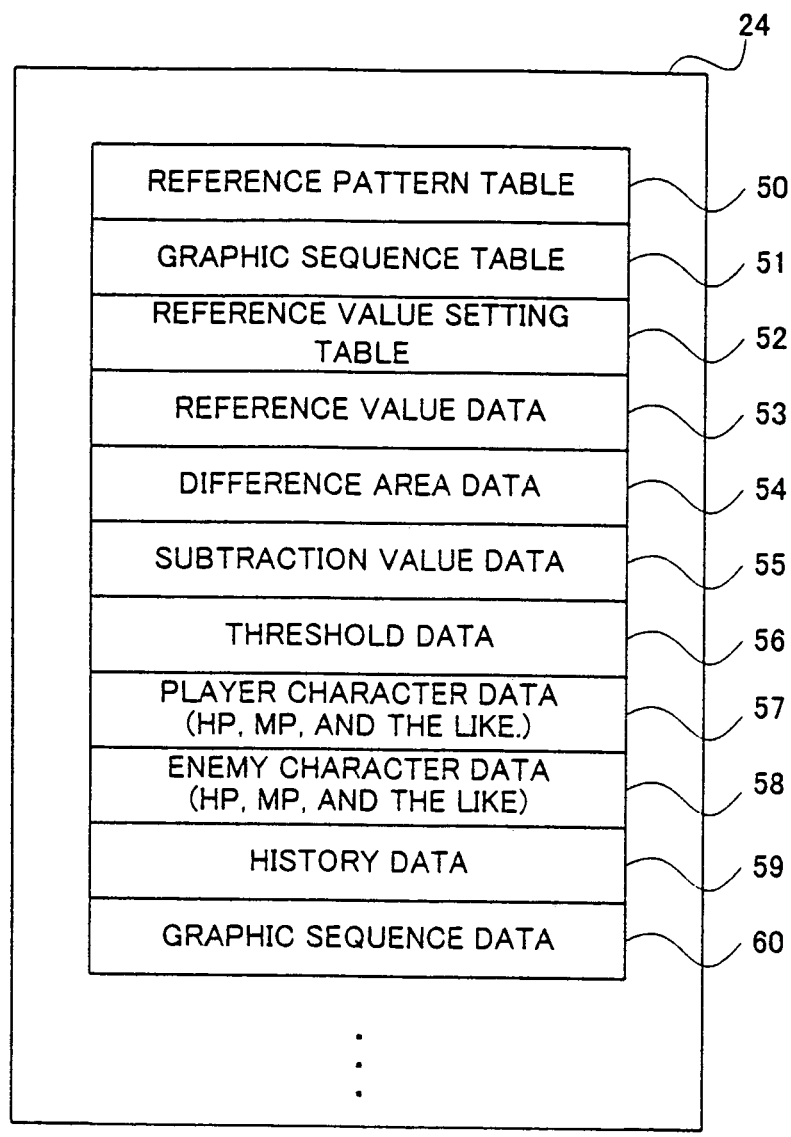
FIG. 20 is an illustration showing primary data stored in a RAM 24 of a game apparatus 10.

Next, a detailed game process performed in the game apparatus 10 through executing a game program will be described. Firstly, data primarily used in the game process will be described with reference to FIGS. 20 to 24. FIG. 20 is an illustration showing primarily used data stored in the RAM 24 of the game apparatus 10. As shown in FIG. 20, the RAM 24 stores a reference pattern table 50, a graphic sequence table 51, a reference value setting table 52, reference value data 53, difference area data 54, subtraction value data 55, threshold data 56, player character data 57, enemy character data 58, history data 59, graphic sequence data 60, and the like. Note that in addition to the data shown in FIG. 20, the RAM 24 stores coordinates and the like detected by the touch panel 15.

FIG. 21 is an illustration showing one example of a reference pattern table. As shown in FIG. 21, the reference pattern table 50 includes graphic numbers, graphic data, and default reference values for each or the reference patterns previous prepared. The graphic number is a unique number assigned to each of the reference patterns in order to identify each. The graphic data indicates a shape of a reference pattern. In the present embodiment, the graphic data indicates graphical information of a reference pattern (see FIG. 12A). The default reference value is a reference value initially set to each reference pattern. In the game process, a reference value of each reference pattern is set by adjusting the default reference value thereof through using the reference value setting table 52 described below.

FIG. 22 is an illustration showing one example of a graphic sequence table. As shown in FIG. 22, the graphic sequence table 51 includes graphic sequences, and corresponding types of magic to be cast when the player inputs such graphics in the shown sequence. Note that, numbers shown in parentheses used for indicating a graphic sequence in FIG. 22 correspond to the above-described graphic numbers. In the example shown in FIG. 22, if, for example, a reference pattern having a graphic number "1" and a reference pattern having a graphic number "2" are inputted in the described order in one magic instruction operation, a magic causing a tornado will be cast. Note that all graphic sequences shown in FIG. 22 start with a reference pattern having the graphic number "1", but the reference pattern positioned at first of a graphic sequence may be any reference pattern.

FIG. 23 is an illustration showing one example of a reference value setting table. As shown in FIG. 23, the reference value setting table 52 includes graphic numbers or reference patterns and corresponding amounts of adjustment (adjustment amounts) for default reference values of the reference patterns. Also, here, the adjustment amounts are separately included for a case where a reference pattern is firstly inputted under one magic instruction operation, for a case where a reference pattern is secondly inputted under the one magic instruction operation, and for a case where a reference pattern is thirdly inputted under the one magic instruction operation. In an example of FIG. 23, when, for example, a reference pattern having the graphic number "1" is firstly inputted under one magic instruction operation, a reference value is set to be an original default reference value. When the reference pattern having the graphic number "1" is secondly inputted under the one magic instruction operation, the reference value is set to be a value which is the default reference value plus five. When the reference pattern having the graphic number "1" is inputted under one magic instruction operation thirdly or after, the reference value is set to be a value which is the default reference value plus ten.

The three tables (the reference pattern table 50, the graphic sequence table 51, and the reference value setting table 52) described above are stored in the ROM 171 of the memory card 17, and are read into the RAM 24 with an arbitrary timing after a game process is started. Note that contents of each of the tables read into the RAM 24 may be changed according to a game course or to the player.

Again in FIG. 20. The reference value data 53 indicates a reference value set to each reference pattern. The difference area data 54 indicates a difference area between a subject graphic inputted by the player and each of the reference patterns. The subtraction value data 55 indicates a subtraction value obtained by subtracting a difference area from a reference value of each of the reference patterns. The reference value data 53, the difference area data 54, and the subtraction value data 55 are calculated during a game process described below, and stored in the RAM 24. Also, the threshold data 56 indicates a predetermined threshold value, is stored in the ROM 171, and is read into the RAM 24 with an arbitrary timing after the game process is started.

Also, the player character data 57 indicates various states of a player character. The player character data 57 includes data indicating a hit point (HP) and data indicating a magic point (MP) of the player character. The enemy character data 58 indicates various states of an enemy character. The enemy character data 58 includes data indicating a hit point (HP) and data indicating a magic point (MP) of the enemy character. The enemy character data 58 is set for the number of enemy characters currently present.

Also, the history data 59 indicates a history of information for the a aforementioned degree or similarity. FIG. 24 is an illustration showing one example of history data. As shown in FIG. 24, in the present embodiment, the history data 59 indicates a correspondence between the graphic number or a reference pattern and an average difference area of the reference pattern. Here, the average difference area is an example of information for a degree of similarity, and, in a case where a shape of a subject graphic is identified as a shape of the reference pattern, is an average value of the difference areas, up to the current time, between the subject graphic and the reference pattern. The average difference area can be regarded as an indicator indicating an operation skill so the player in a graphic input. Note that the history data 59 includes not only the average difference area but also a history of the difference areas used for calculating the average difference area. The history data 59 is not limited to data indicating the average difference area and may be any data indicating a history of a degree of similarity. Also, the history data 59 may be erased each time when a game process ends, or history data obtained in a past game process may be used in a subsequent game process. For example, the game apparatus 10 may retain past history data as save data in the memory card 17 of the RAM 172, and may be read into the RAM 24 of the game apparatus 10 when the subsequent game process is started.

The graphic sequence data 60 indicates a graphic sequence, of reference patterns having been inputted by the player, arranged in the order of input. For example, the graphic sequence data 60 indicates graphic numbers of reference patterns in the order in which the graphics are inputted.

Figure 25:
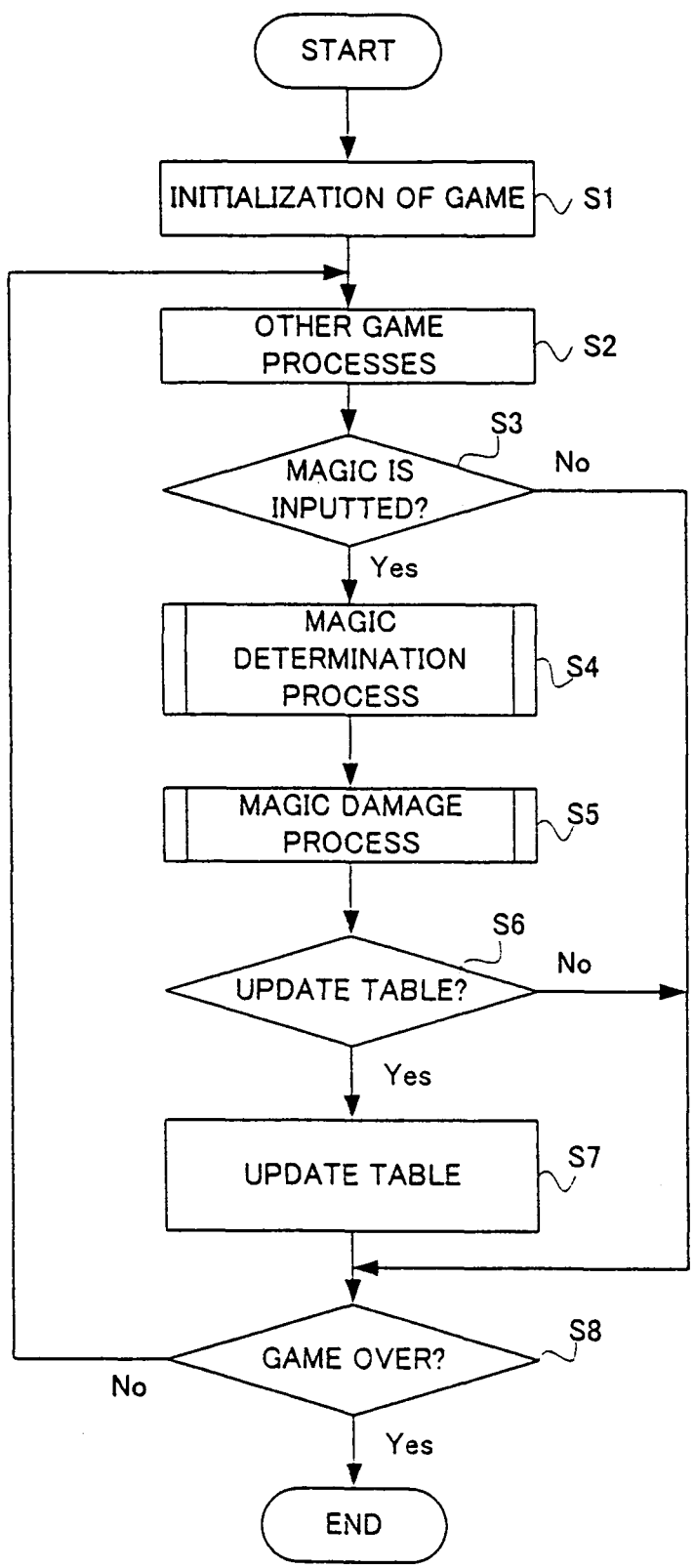
FIG. 25 is a flowchart illustrating a flow of a game process executed in the game apparatus 10.

Next, with reference to FIGS. 25 to 31, a detailed game process performed in the game apparatus 10 by executing a game program will be described. FIG. 25 is a flowchart showing a flow of a game process executed in the game apparatus 10. When the power of the game apparatus 10 is turned on, the CPU core 21 of the game apparatus 10 executes a start program stored in the boot ROM not shown, and units such as the RAM 24 are initialized. Then, a game program stored in the memory card 17 is read into the RAM 24, and the CPU core 21 starts executing the game program. The flowchart shown in FIG. 25 indicates a game process subsequently performed after the above described process is completed. Note that FIGS. 25 to 31 indicate a detailed process for a magic instruction operation in a battle scene of the present game, and a detailed description of other game processes irrelevant to the invention of the present application is omitted.

At step S1 of FIG. 25, an initialization process of the game is first performed. Specifically, for data to be set with initial values, predetermined initial values are stored in the RAM 24. For example, values of the HP and the MP of the player character are stored as the player character data 57 in the RAM 24. At the following step S2, the other game processes are performed. "The other game processes" performed at step S2 include, for example, processes for various events (e.g., the player character moving in a game space, an item being acquired, and so on) occurring in accordance with a game course in the normal scene. Also, "the other game processes" include a process for attacking the player character that is performed by the enemy character in the battle scene. These other game processes at step S2 have no particular relevance to the invention of the present application, and therefore a detailed description thereof is omitted.

At step S3, it is determined whether or not a magic instruction operation is to be performed by the player. Specifically, at step S3, the determination is performed as to whether or not the battle scene has been started and a turn for the player character to attack has come around. If it is determined at step S3 that a magic instruction operation is to be performed by the player, a process at steps S4 to S7 are performed. On the other hand, if it is determined that a magic instruction operation is not to be performed by the player, the process at steps S4 to S7 are skipped, and a process at step S8 is performed.

At step S4, a magic determination process is performed. In the magic determination process, a magic instruction operation from the player is received, and a type of magic to cast is determined in accordance with the magic instruction operation. Hereinafter, with reference to FIGS. 26 to 30, the detailed magic determination process will be described.

Figure 26:
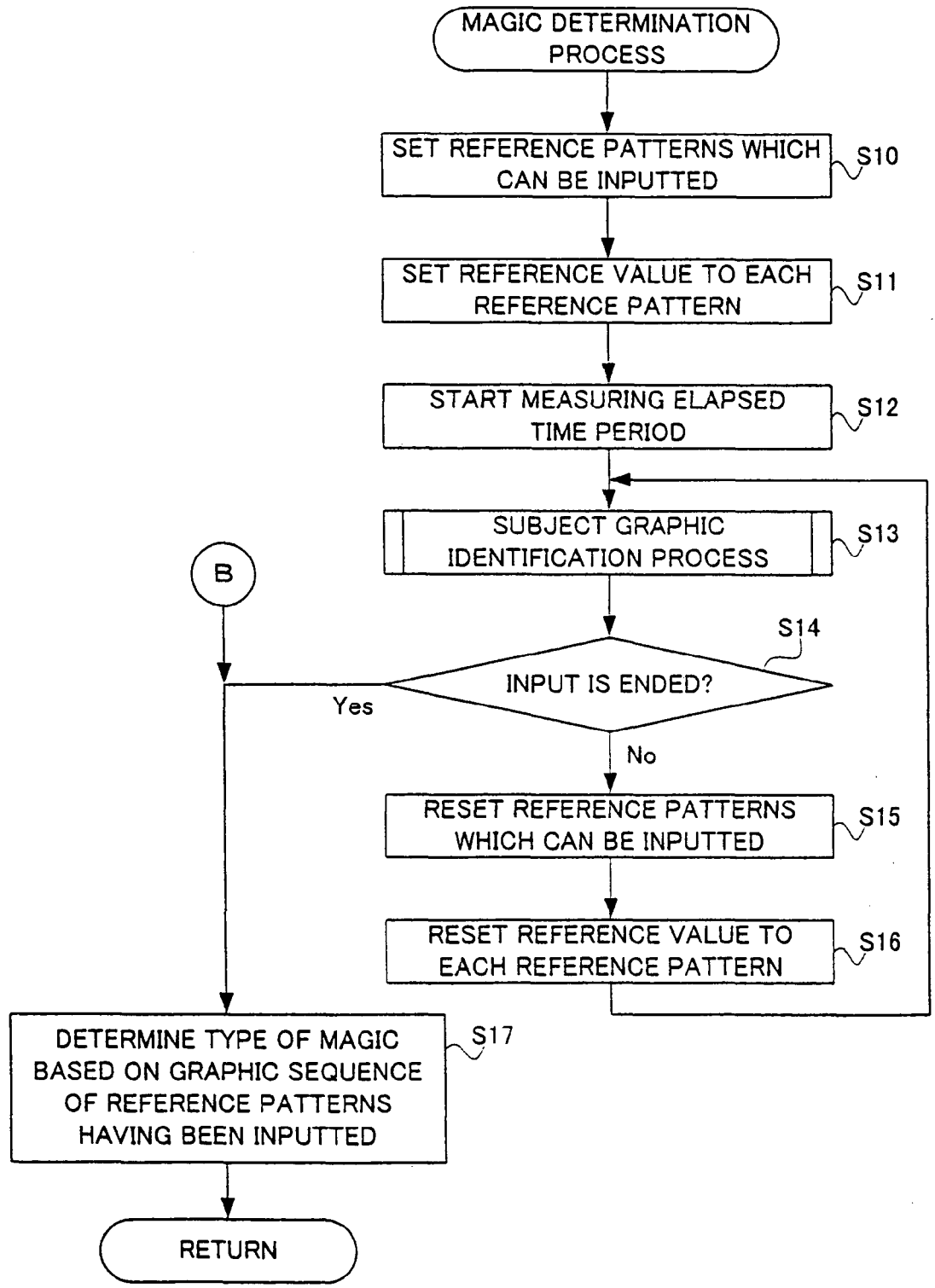
FIG. 26 is a flowchart illustrating a detailed process flow at step S4 shown in FIG. 25.

FIG. 26 is a flowchart showing a detailed process flow at step S4 shown in FIG. 25. In the magic determination process shown in FIG. 26, types of reference patterns which can be inputted are first set at step S10. Normally, at step S10, a plurality of types of reference patterns are set. Note that types of reference patterns set at step S10 may be predetermined, or may be set in accordance with a state of a game course (e.g., a level of the player character). Reference pattern icons indicating reference patterns set at step S10 are displayed on the first LCD 11 at an appropriate time (see FIG. 3).

At step S11, a reference value is set to each of the reference patterns set at step S10. A process at step S11 is performed by using the reference pattern table 50 and the reference value setting table 52 stored in the RAM 24. Specifically, the CPU core 21 first refers to the reference pattern table 50 (see FIG. 21) for each of the reference patterns set at step S10 for reading out a default reference value thereof. Next, the CPU core 21 refers to the reference value setting table 52 (see FIG. 23) for each of the reference patterns for reading out an adjustment amount thereof. Here, assume the adjustment amount read out is an adjustment amount for a case where the reference pattern is first inputted. Lastly, the CPU core 21 takes a value, as a reference value, obtained by adjusting the default reference value in accordance with the adjustment amount. In FIGS. 21 and 23, at step S10, if, for example, a reference pattern having the graphic number "1" is set, the default reference value thereof is "50", and the adjustment amount thereof is "0". Therefore, the reference value of the reference pattern having the graphic number "1" is calculated to be "50". The correspondence between each of the reference patterns set at step S10 and the reference value thereof set at step S11 is stored in the RAM 24 as the reference value data 53.

At step S12 following step S11, measurement of an elapsed time period in the magic instruction operation is started. At the following step S13, a subject graphic identification process is performed. The subject graphic identification process is a process in which a graphic is inputted by the player and a shape of the input graphic (subject graphic) is identified. Hereinafter, with reference to FIGS. 27 to 30, the detailed subject graphic identification process will be described.

Figure 27:
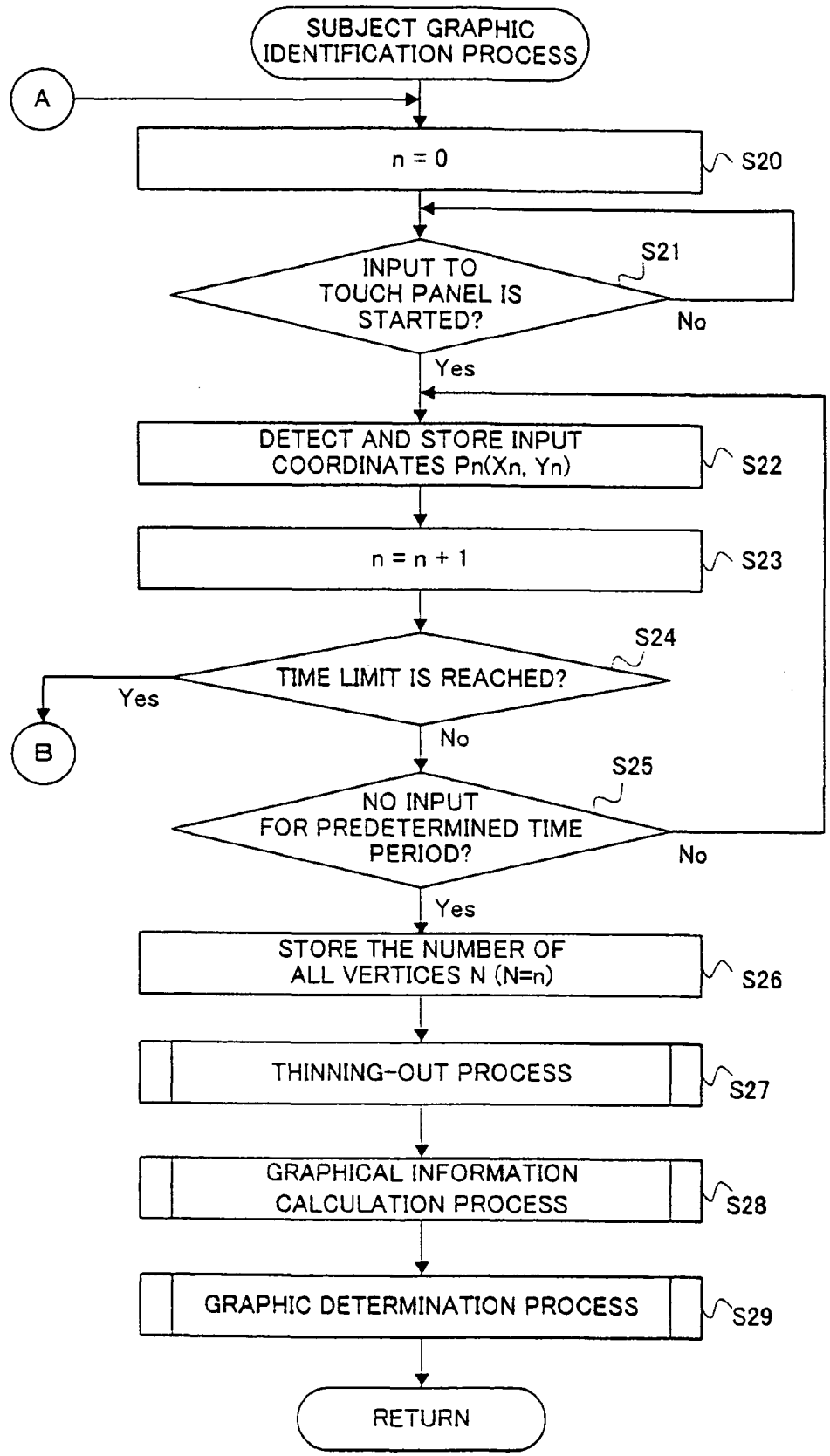
FIG. 27 is a flowchart illustrating a detailed process flow at step S13 shown in FIG. 26.

FIG. 27 is a flowchart showing a detailed process flow at step S13 shown in FIG. 26. In the subject graphic identification process shown in FIG. 27, a value of a counter n is first initialized at step S20. That is, the counter n is set to zero (n=0). This counter n is used for indicating a number of a coordinate point detected as a subject graphic. At the following step S21, it is determined whether or not an input to the touch panel 15 is started. Specifically, it is determined whether or not coordinate data indicating a location of the input is outputted from the touch panel 15. If it is determined at step S21 that an input to the touch panel 15 is not started, a process at step S21 is repeated. On the other hand, if it is determined at step S21 that an input to the touch panel 15 is started, a process at step S22 is performed. That is, the game apparatus 10 waits for the player to perform an input to the touch panel 5, and proceeds to step S22 when the input is detected.

At step S22, the CPU core 21 detects coordinates of a coordinate point to which an input is performed on the input surface of the touch panel 15, and stores the detected coordinates. Specifically, a coordinate value (X, Y) is read from the touch panel 15, and the read value is stored in the RAM 24. Note that a coordinate value detected when the counter n=j (j is an integer equal to or greater than 1) is stored as a coordinate value (Xj, Yj) of a coordinate point p (j). At the following step S23, the counter value n is incremented by 1.

At the following step S24, it is determined whether or not the elapsed time period for which the measurement is started at step S12 has reached the time limit. If it is determined at step S24 that the elapsed time period has not reached the time limit, a process at step S25 is performed. On the other hand, if it is determined at step S24 that the elapsed time period has reached the time limit, a process at step S17 shown in FIG. 26 is performed. Accordingly, when the elapsed time period has reached the time limit, acceptance of a touch input is immediately stopped even when the player is still inputting a graphic. A process at step S17 will be described below.

At step S25, it is determined whether or not an input to the touch panel 15 is not detected for a predetermined time period. Specifically, it is determined whether or not coordinate data is not outputted from the touch panel 15 for a predetermined time period. If it is determined at step S25 that an input to the touch panel 15 is detected during a predetermined time period, the process goes back to step S22. Hereinafter, steps S22 to S25 are repeated until an input to the touch panel 15 is not performed for a predetermined time period. On the other hand, if it is determined at step S25 that an input to the touch panel 15 is not detected during a predetermined time period, a process at step S26 is preformed. That is, at step S26, a value indicating the number N of vertices of the subject graphic stored in the RAM 24. Specifically, a value N is set to the current value n. As a result, the number of vertices of the subject graphic is determined. By the above-described steps S22 to S26, the coordinate points of the trace drawn on the input surface of the touch panel 15 are detected in chronological order, and the detected coordinate points are stored in the RAM 24 in chronological order.

At step S27, the above-described thinning out process is performed for the subject graphic detected at step S22 (see FIGS. 8A to 8D). The thinning-out process is performed for thinning out some coordinate points from the coordinate points composing the subject graphic in order to extract a line factor from the subject graphic. Hereinafter, details of the thinning-out process will be described by using FIG. 28.

Figure 28:
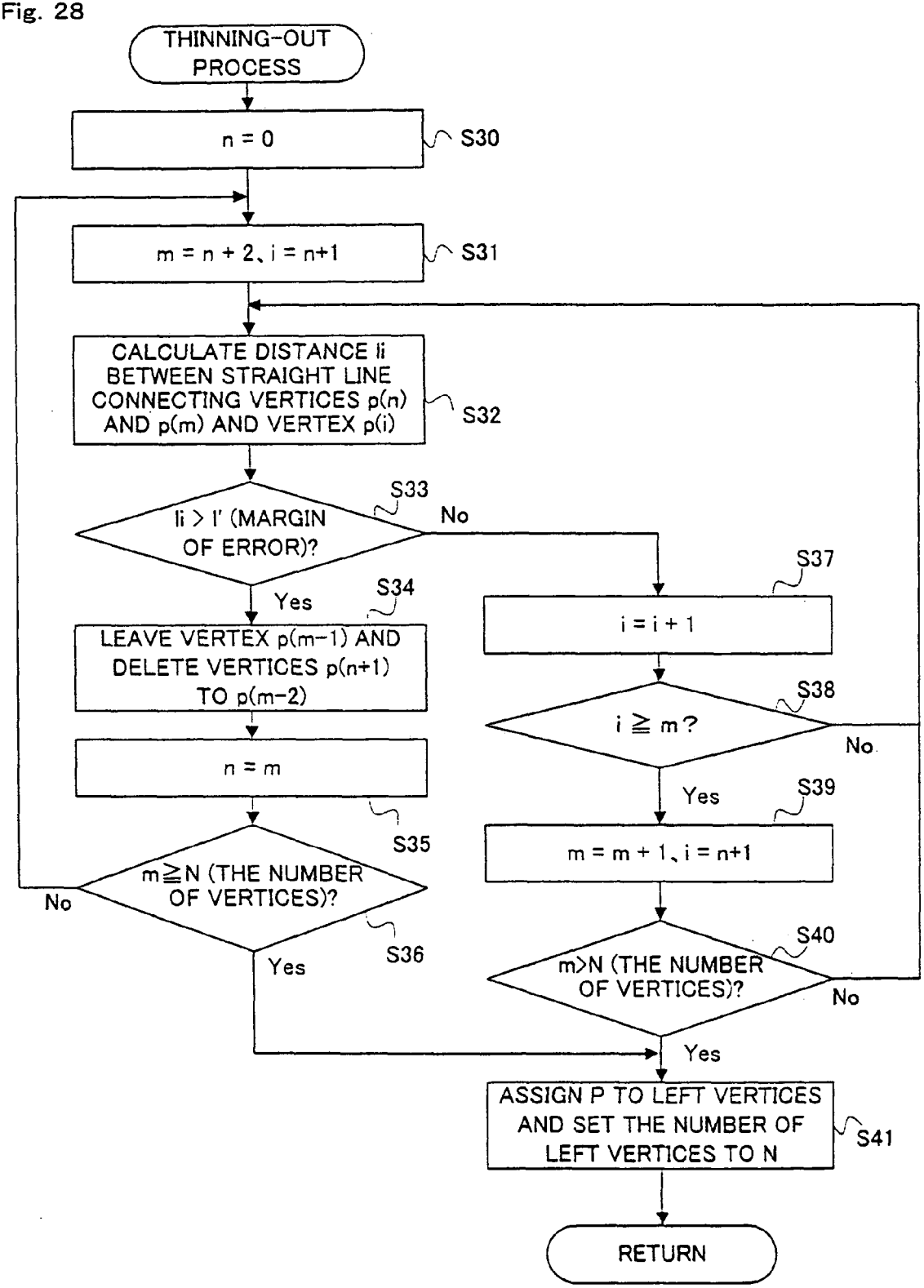
FIG. 28 is a flowchart illustrating a detailed process flow at step S27 shown in FIG. 27.

FIG. 28 is a flowchart showing a detailed process flow of step S27 as shown in FIG. 27. In the thinning-out process shown in FIG. 28, a value of the counter n is first set to zero (n=0) at step S30. In the thinning-out process, the counter n is used for indicating a front endpoint of a straight line when a distance between the straight line and a coordinate point is calculated. At the following step S31, a value of a counter m is set to n+2 (m=n+2), and a value of a counter i is set to n+1 (i=n+1). In the thinning-out process, the counter m is used for indicating a back endpoint of a straight line when a distance between the straight line and a coordinate point is calculated. The counter i is used for indicating a coordinate point when a distance between a straight line and the coordinate point is calculated. A value of the counter n is set at step S30 and a value of the counter m is set at step S31, whereby a straight line based on which a distance to each coordinate point is to be calculated is selected.

At step S32 following step S31, a distance between the currently-selected straight line and a coordinate point lying between the endpoints of the above straight line is calculated. Specifically, a distance l (i) between a straight line whose front endpoint is a coordinate point (coordinate point p (n)) indicated by the counter n and whose back endpoint is a coordinate point (coordinate point p (m))) indicated by the counter m and a coordinate point (coordinate point p (i)) indicated by the counter i is calculated. The above distance l (i) can be calculated by using the following equation (1):

$$l(i)=((Xm-Xn)(Yi-Yn)-(Ym-Yi)(Xi-Xn)^2/((Xm-Xn)^2+(Ym-Yn)^2) \qquad (1)$$

At step S33, it is determined whether or not the distance l (i) calculated at step S32 is greater than a margin of error l'. A value of the above margin of error l' is previously determined. If it is determined at step S33 that the distance l (i) is greater than the margin of error l', a process at step S34 is performed. On the other hand, if it is determined at step S33 that the distance l (i) is equal to or smaller than the margin of error l', a process at step S37 is performed.

Firstly, a case in which it is determined at step S33 that the distance l (i) is greater than the margin of error l' will be described. At step S34, a process for deleting a coordinate point is first performed. The coordinate points p (n+1) top (m−2) are deleted by the above process. For example, in the case of n=0, m=3, and i=2, a coordinate point p1 is deleted (see FIG. 8C) Specifically, a coordinate value of the coordinate point p1 is deleted from the RAM 24. At the following step S35, a value of the counter n is set to a value of the counter m. Further, at step S36, it is determined whether or not a value of the counter m is equal to or greater than the number N of vertices. The process at step S36 is performed for determining whether or not the thinning-out process is performed for a coordinate point p (N), which is an ending point of the subject graphic. If it is determined at the step S36 that a value of the counter m is equal to or greater than the number N of vertices, a process at step S41 is performed. The process at step S41 will be described below. On the other hand, if it is determined at step S36 that a value of the counter m is smaller than the number N of vertices, the process goes back to step S31.

Next, a case in which it is determined at step S33 that the distance l (i) is equal to or smaller than the margin of error l' will be described. Firstly, a value of the counter i is incremented at step S37. At the following step S38, it is determined whether or not a value of the counter i is equal to or greater than a value of the counter m. The value of the counter i equal to or greater than the value of the counter m indicates that a distance between the currently selected straight line and each of all coordinate points laying between the endpoints of the straight line has been calculated. On the contrary, the value of the counter value i smaller than the value of the counter value m indicates that a distance between the currently selected straight line and at least one of the coordinate points lying between the endpoints of the straight line has not yet been calculated. Thus, if it is determined at step S38 that a value of the counter i is smaller than a value of the counter m, a process at step S32 is performed for calculating a distance between the currently selected straight line and an unprocessed coordinate point. On the other hand, if it is determined at step S38 that a value of the counter i is equal to or greater than a value of the counter m, the selected straight line is changed. Specifically, at step S39, a value of the counter m is incremented. Also, at step S39, a value of the counter i is set to n+1 (i=n−1). Further, at the following step S40, it is determined whether or not a value of the counter m is greater than the number N of vertices. A process at step S40 is performed for determining whether or not the thinning-out process is performed for a coordinate point p (N), which is an ending point of the subject graphic. If it is determined at step S40 that a value of the counter m is equal to or smaller than the number N of vertices, the process goes back to step S32. On the other hand, if it is determined at step S40 that a value of the counter m is greater than the number N of vertices, a process at step S41 is performed.

At step S41, a new number is assigned to a coordinate point (vertex) which is left after deletion by the thinning-out process. Specifically, in accordance with the order of input, numbers P0, P1, P2, . . . are assigned to the respective coordinate values of the coordinate points (vertices) left after deletion by the thinning-out process. Note that, in the following graphics identification process, a coordinate value of a vertex Pj (j is an arbitrary integer equal to or greater than 1) is represented as (Xj, Yj). Also, at step S41, a value of the number N of vertices is reset to the number of vertices left after deletion by the thinning-out process. After completion of step S41, the CPU core 21 ends the thinning-out process performed at step S27.

Again in FIG. 27, after step S27, a graphical information calculation process is performed at step S28. The graphical information calculation process is performed for calculating graphical information of the subject graphic, that is, a line segment distance of each vertex and an absolute angle of each side. Hereinafter, details of the graphical information calculation process will be described by using FIG. 29.

Figure 29:
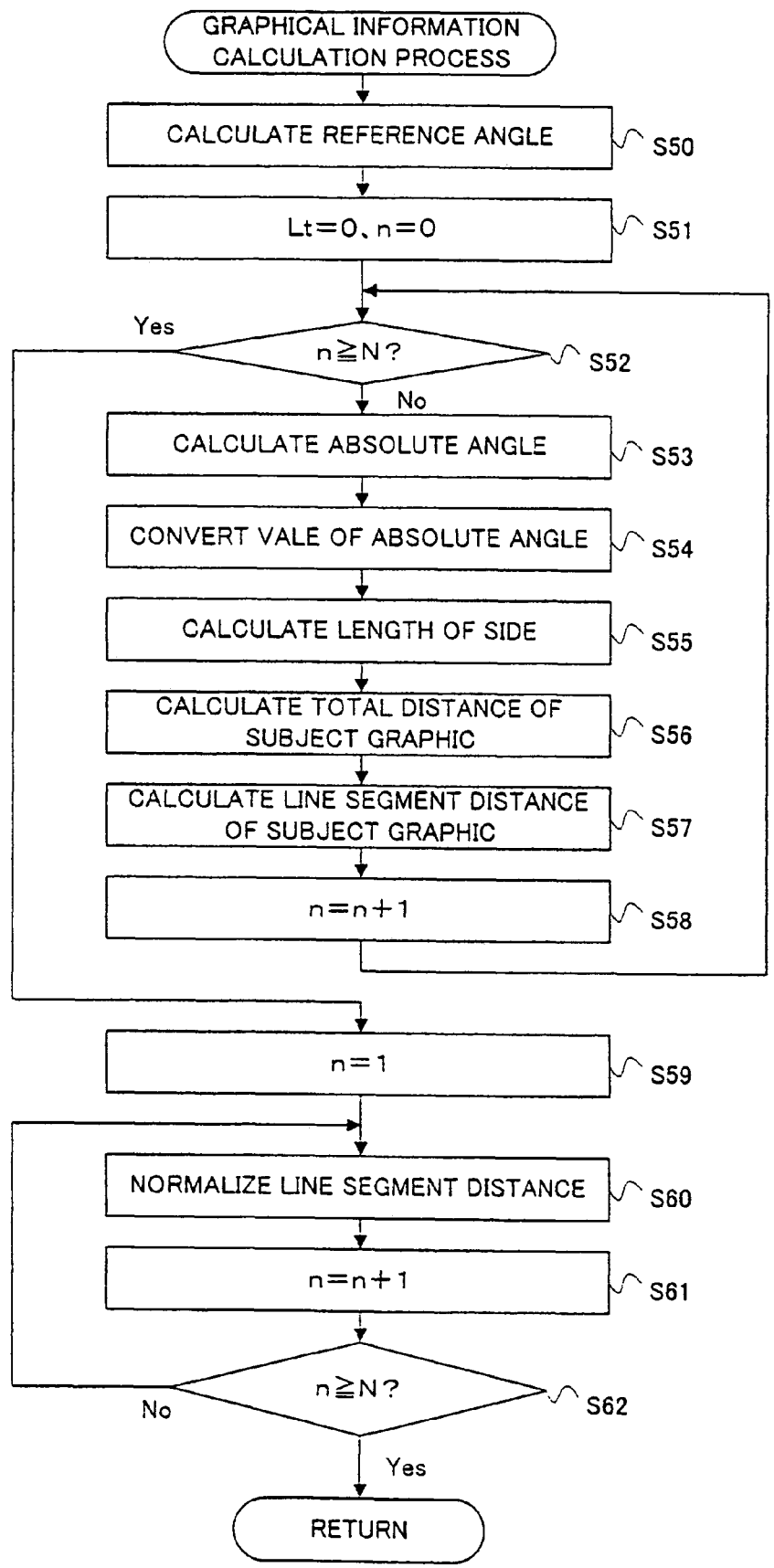
FIG. 29 is a flowchart illustrating a detailed process flow at step S28 shown in FIG. 27.

FIG. 29 is a flowchart showing a detailed process flow of step S28 as shown in FIG. 27. In the graphical information calculation process at step S28, a reference angle is first calculated at step S50. The reference angle is used for converting an absolute angle of each side to a value based on the reference angle. Specifically, the reference angle is an angle of the first side of the subject graphic with respect to the normal direction of an x-axis of the input surface. Note that the first side of the subject graphic is a side connecting the vertex P0 and the vertex P1. The reference angle $\Theta'$ can be calculated by using the following equation (2), for example:

$$\Theta = \arctan((Y1-Y0)/(X1-X0)) \tag{2}$$

Next, at step S51, a variable Lt indicating a total sum of lengths of the sides of the subject graphic is set to zero. Further, a counter n is set to zero (n=0). In the graphical information calculation process, the counter n is used for indicating a vertex Pn of the subject graphic. At the following step S52, it is determined whether or not a value of the counter n is equal to or greater than the number N of vertices. Determination at step S52 is performed for calculating a line segment distance of each of all vertices of the subject graphic and determining whether or not an absolute angle of each of all sides is calculated. If it is determined at step S52 that a value of the counter n is equal to or greater than a value of the number N of vertices, a process at step S59 is performed. The process after step S59 will be described below.

On the other hand, if it is determined at step S52 that a value of the counter n is smaller than a value of the number N of vertices, a process at step S53 is performed. That is, at step S53, an absolute angle $\Theta n$ of a side connecting the vertex Pn and the vertex Pn+1 is calculated. Specifically, the absolute angle $\Theta n$ is calculated by using the following equation (3):

$$\Theta n = \arctan((Y(n+1)-Yn)/(X(n+1)-Xn)) \tag{3}$$

Note that the absolute angle calculated by the equation (3) is calculated with respect to the normal direction of the x-axis of the input surface. Thus, at the following step S54, the value of the absolute angle calculated at step S53 is converted to a value based on the above-described reference angle. That is, the value of the absolute angle $\Theta n$ is converted to a value obtained by subtracting the reference angle $\Theta'$ from the absolute angle $\Theta n$ calculated at step S53.

At step S55 following step S54, a length L'n of a side connecting the vertex Pn and the vertex P (n+1) is calculated. Specifically, the length L'n is calculated by using the following equation (4):

$$L'n = (((X(n+1)-Xn))^2 + ((Y(n+1)-Yn))^2)^{1/2} \tag{4}$$

At the following step S56, a total distance of the subject graphic is calculated. Specifically, a value of the valuable Lt indicating the total sum of the lengths of the sides of the subject graphic is updated. The value of the valuable Lt is updated so as to become a value obtained by adding L'n to the pre-update value. By repeating the process at step S56 until n=N, the value of the variable Lt finally becomes a value indicating the total sum of the lengths of the sides of the subject graphic, that is, the total distance of the subject graphic. At the following step S57, a line segment distance Ln of the vertex P (n) is calculated by using L'n calculated at step S55. Specifically, a value of Ln is calculated by using the following equation (5):

$$Ln = L'n + L(n-1) \tag{5}$$

Note that, in the equation (5), a value of L (n−1) has been calculated at the previous step S57. Also, in the case of n=0, calculation is performed on the assumption that L (n−1)=0.

At step S58 following step S57, a value of the counter n is incremented. After step S58, the process goes back to step S52. Hereinafter, steps S52 to S58 are repeated until n≥N.

Next, a process after step S59 will be described. Firstly, at step S59, a value of the counter n is set to zero (n=0) At the following step S60, a value of the line segment distance Ln is normalized. Specifically, a value of the line segment distance Ln is converted to a value obtained by multiplying the pre-converted Ln by La/Lt. Note that La is the above-described reference distance. By step S60, a value of the converted L (N) is normalized so as to be La (L (N)=La).

At the following step S61, a value of the counter n is incremented. Further, at the following step S62, it is determined whether or not a value of the counter n is equal to or greater than a value of the number N of vertices. Determination at step S562 is performed for determining whether or not normalization is performed for a line segment distance of each of all vertices of the subject graphic. If it is determined at step S62 that the value of the counter n is smaller than the value of the number N of vertices, the process at step S60 is performed. Hereinafter, steps S60 to S62 are repeated until n≥N. On the other hand, if it is determined at step S62 that the value of the counter n is equal to or greater than the value of the number N of vertices, the CPU core 21 ends the graphical information calculation process.

Again in FIG. 27, after step S28, a graphic determination process is performed at step S29. The graphic determination process is performed for determining a shape of a graphic (a shape of a subject graphic) based on the identification results. Hereinafter, details of the graphic determination process will be described with reference to FIG. 30.

Figure 30:
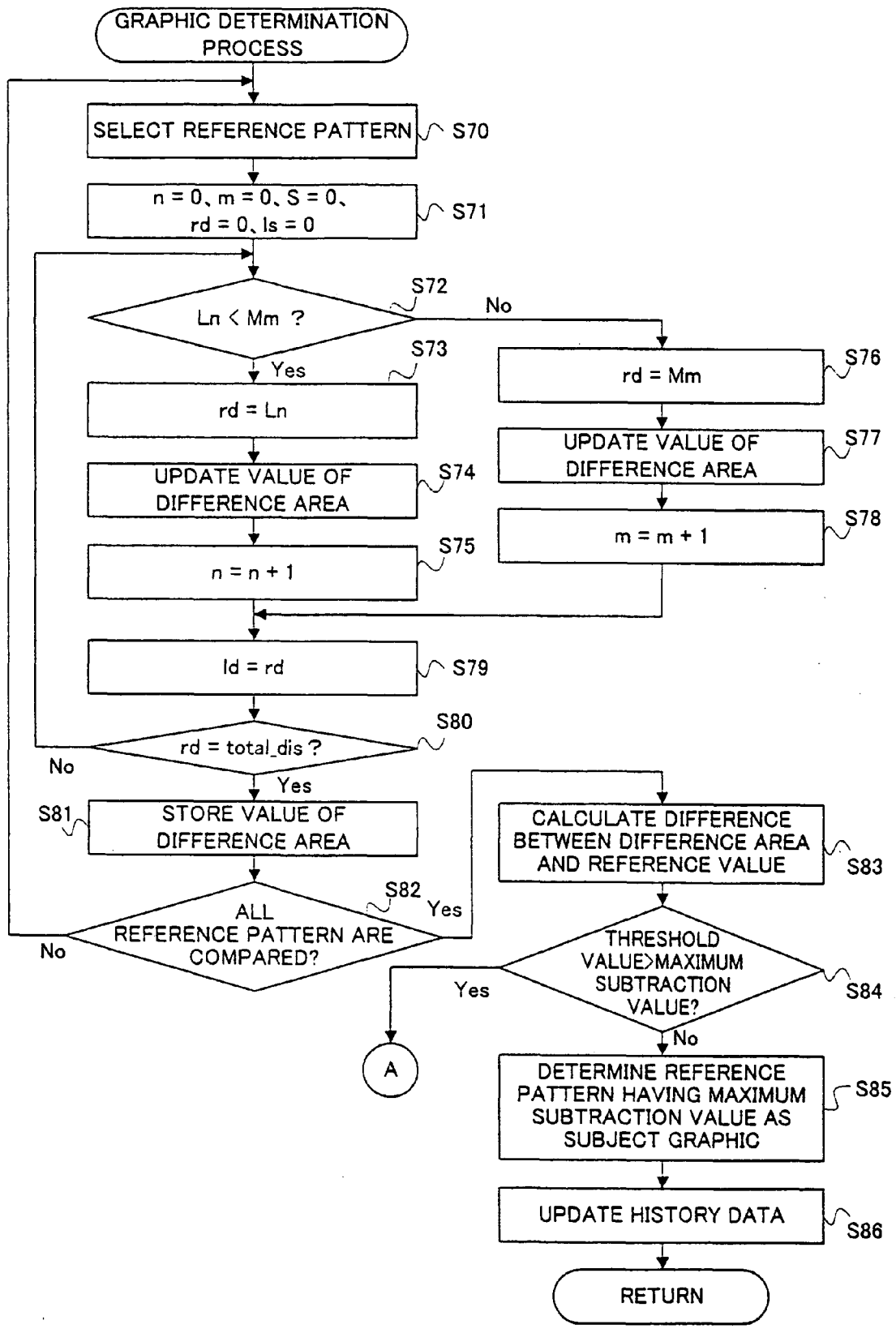
FIG. 30 is a flowchart illustrating a detailed process flow at step S29 shown in FIG. 27.

FIG. 30 is a flowchart showing a detailed process flow of step S29 as shown in FIG. 27. In the graphic determination process at step S29, one of the reference patterns set at step S10 or S15 is first selected at step S70, and graphical information of the selected reference pattern is read. Note that, at step S70, one of the reference patterns which have not yet been selected is selected.

At step S71, a value of each variable used in the graphic determination process is initialized. Specifically, a value of each of a counter n, a counter m, a variable S, a variable rd, and a variable id is set to zero. Note that, in the graphic determination process, the counter n indicates a vertex Pn of the subject graphic. Also, in the graphic determination process, the counter m indicates a vertex Qm of the reference pattern. The variable S is used for calculating a difference area.

At step S72, it is determined whether or not a line segment distance Ln of the vertex Pn of the subject graphic is smaller than a line segment distance Mm of the vertex Qm of the reference pattern. If it is determined at step S72 that the line segment distance Ln is smaller than the line segment distance Mm, a process at steps S73 to S75 is performed. On the other hand, if it is determined at step S72 that the line segment distance Ln is equal to or greater than the line segment distance Mm, a process at steps S76 to S78 is performed.

Firstly, the process at steps S73 to S75 will be described. At step S73, a value of the variable rd is set to Ln (rd=Ln). At the following step. S74, a value of the valuable S is updated. Specifically, a value of the updated variable S is calculated by the following equation (6):

$$S=S'+|(ld-rd)\cdot(\Theta n-\phi m)| \quad (6)$$

Note that, in the equation (6), S' is a pre-update variable S. At the following step S75, a value of the counter n is incremented. After step S75, a process at step S79 is performed. The process at step S79 will be described further below.

Next, the process at steps S76 to S78 will be described. At step S76, a value of the variable rd is se to Mm (rd=Mm). At the following step S77, a value of the variable S is updated. Specifically, a value of the updated variable S is calculated by using the above-described equation (6). At the following step S78, a value of the counter m is incremented. After step S76, a process at step 379 is performed.

Here, as shown in FIG. 13, the portions which are not shared by the graphs of the subject graphic and the reference pattern can be divided into one or more rectangles. Thus, a difference area can be calculated by calculating an area of each of the above rectangles. The process at steps S73 to S75 and the process at steps S76 to S78 are performed for calculating a difference area by calculating an area of each of the rectangles and performing cumulative addition of the calculated area. In the process at steps S73 to S75 and at steps S76 to S78, the variable rd is set so as to indicate an x coordinate on the right edge of the rectangle, and the variable $ld$ is set so as to indicate an x coordinate on the left edge of the rectangle. In this case, one of $\Theta n$ and $\phi m$ indicates an upper end of the rectangle, and the other indicates a lower end thereof. Thus, an area of the rectangle can be calculated by the above equation (6).

At step S79, a value of the variable Id is updated to a value of the variable rd. At the following step S80, it is determined whether or not a value of the variable rd becomes a value of the reference distance ("total_dis" in FIG. 30). A process at step S30 is performed for determining whether or not areas of all rectangles included in the portions which are not shared by the graphs of the subject graphic and the reference pattern are calculated. If it is determined at step S80 that a value of the variable rd does not become a value of the reference distance, the process goes back to step S72. Hereinafter, steps S72 to S80 are repeated until a value of the variable rd becomes a value of the reference distance. On the other hand, if it is determined at step S80 that a value of the variable rd becomes a value of the reference distance, a process at step S81 is performed. That is, at step S81, a value of the variable S is stored in the RAM 24 as a difference area data 54. As a result, a difference area of the graphs of the reference pattern selected at step S70 and the trace graph is calculated.

At step S82 following step S81, it is determined whether or not all reference patterns set at step S10 or S15 are compared with the subject graphic. That is, it is determined whether or not a difference area of each or all reference patterns set at step 310 or S15 is calculated. If it is determined at step S82 that all reference patterns are not compared with the subject graphic, the process goes back to step S70. Steps S70 to S72 are repeated until all reference patterns are compared with the subject graphic. On the other hand, if it is determined at step S82 that all reference patterns are compared with the subject graphic, a process at step S83 is performed.

A step S83, a subtraction value obtained by subtracting the difference area from the reference value is calculated for each of the reference patterns. The reference value of each reference pattern is stored, in the RAM 24, as the reference value data 53 (step S11 or S16). The difference area of each reference pattern is stored, in the RAM 24, as the difference area data 54 (step S81). The subtraction values calculated for each of the reference patterns are stored, in the RAM 24, as the subtraction value data 55. At the following step S84, it is determined whether or not a maximum subtraction value among the subtraction values calculated at step S83 is smaller than a predetermined threshold value. Note that the threshold value is a value indicated by the threshold data 56 stored in the RAM 24. Here, if the maximum subtraction value is smaller than the threshold value, it is indicated that the subject graphic is not substantially similar to a reference pattern used for calculating the subtraction value. The determination process at step S84 is performed for determining, in a case where a shape of the subject graphic substantially differs from a shape of each of the reference patterns, the input of the subject graphic as an input error. Therefore, if it is determined at step S84 that the maximum subtraction value is smaller than the threshold value, the process goes back to step S20. In such a case, the player inputs the graphic again. On the other hand, if it is determined at step S84 that the maximum subtraction value is equal to or greater than the threshold value, a process at step S85 is performed.

At step S85, the shape of the subject graphic is determined. Specifically, a shape of a reference pattern having the maximum subtraction value calculated at step S83 from among the reference patterns is determined as the shape of the subject graphic. Note that the CPU core 21 generates a new graphic sequence by adding the reference pattern determined at step S85 to the end of the graphic sequence indicated by the graphic sequence data 60 in the RAM 24. Content of the graphic sequence data 60 in the RAM 24 is updated to the new graphic sequence. Also, the CPU core 21 displays, on the first LCD 11 at an appropriate time, a having-been-inputted icon 43 indicating the reference pattern having been determined (see FIG. 6). At the following step S86, the history data 59 in the RAN 24 is updated. Specifically, an average difference area of the reference pattern determined at step S85 is updated to a value for which the difference area stored in the RAM 24 at step S81 is taken into account. After a process at step S86, the CU core 21 ends the graphic determination process shown in FIG. 30.

Again in FIG. 27, with a completion of the graphic determination process at step S29, the subject graphic identification process shown in FIG. 27 ends. In the magic determination process of FIG. 26, when the subject graphic identification process at step S13 ends, a process at step S14 is subsequently performed. At step S14, it is determined whether or not a touch input by the player is ended. Specifically, it is determined whether or not an instruction indicating an end of the touch input is given by the player. As described above, the instruction may be performed by drawing a specific graphic using a touch input or by pressing one of the switches provided on the game apparatus 10. If it is determined at step S14 that the touch input is to be ended, a process at step S17 described below is performed. On the other hand, if it is determined that the touch input is not to be ended, a process at step S15 is performed.

At step S15, types of reference patterns which can be inputted are reset. The process at step S15 is performed by referring to the graphic sequence table 51. That is, the CPU core 21 selects a possible graphic sequence from among the graphic sequences included in the graphic sequence table 51 in the RAM 24. Then, by comparing the selected graphic sequence and the reference patterns having been currently inputted, reference patterns which can be subsequently inputted are identified. The identified reference patterns are reference patterns set at step S15. This is specifically described with reference to FIG. 22. Here, assume that five graphic sequences shown in FIG. 22 are included in the graphic sequence table 51. If a reference pattern having the graphic number "1" has been currently inputted by the time of performing step S15, reference patterns having the graphic number "2" and "3" are set as reference patterns which can be inputted.

At step S16 following step S15, a reference value is set to each of the reference patterns set at step S15. The process at step S15 is performed by using the reference pattern table 50 and the reference value setting table 52 stored in the RAM 24. Specifically, the CPU core 21 first refers to the reference pattern table 50 (see FIG. 21) for each of the reference patterns set at step S35 for reading out a default reference value thereof. Next, the CPU core 21 refers to the reference value setting table 52 (see FIG. 23) for each of the reference patterns for reading out an adjustment amount thereof. Here, the adjustment amount read out is the adjustment amount for a case where the reference pattern is secondly inputted or a case where the reference pattern is inputted thirdly or after. Lastly, the CPU core 21 takes a value, as a reference value, obtained by adjusting the default reference value in accordance with the adjustment amount. When describing with reference to FIGS. 21 and 23, if, for example, the reference pattern having the graphic number "1" is set at step S15, the default reference value thereof is "50", and the adjustment amount thereof is "+5 (the adjustment amount for a case where the reference pattern is secondly inputted)" or "+10 (the adjustment amount for a case where the reference pattern is inputted thirdly or after)". Accordingly, in a case where one graphic has been inputted, the reference value of the reference pattern is calculated to be "55". In a case where two or more graphics have been inputted, the reference value of the reference pattern is calculated to be "60". The correspondence between each of the reference patterns set at step S15 and the reference value set at step S16 is stored, in the RAM 24, as the reference value data 53. The above described step S16 enables, when reference patterns are successively inputted, the reference values of the reference patterns to change in accordance with the order of input. After step S16, the process goes back to step S13. Thereafter, a process at steps S13 to S16 is repeated until it is determined that a touch input is to be ended at step S14.

On the other hand, at step S17, a type of magic is determined based on the graphic sequence of the reference patterns having been inputted. Specifically, the CPU core 21 refers to the graphic sequence table 51 for determining a magic corresponding to the graphic sequence indicated by the graphic sequence data 60. After step S17 ends, the CPU core 21 ends the magic determination process of FIG. 26.

Again in FIG. 25, a magic damage process is performed at step S5 following step S4. The magic damage process is performed for damaging the enemy character by the magic determined in the magic determination process. Hereinafter, details of the magic damage process will be described with reference to FIG. 31.

Figure 31:
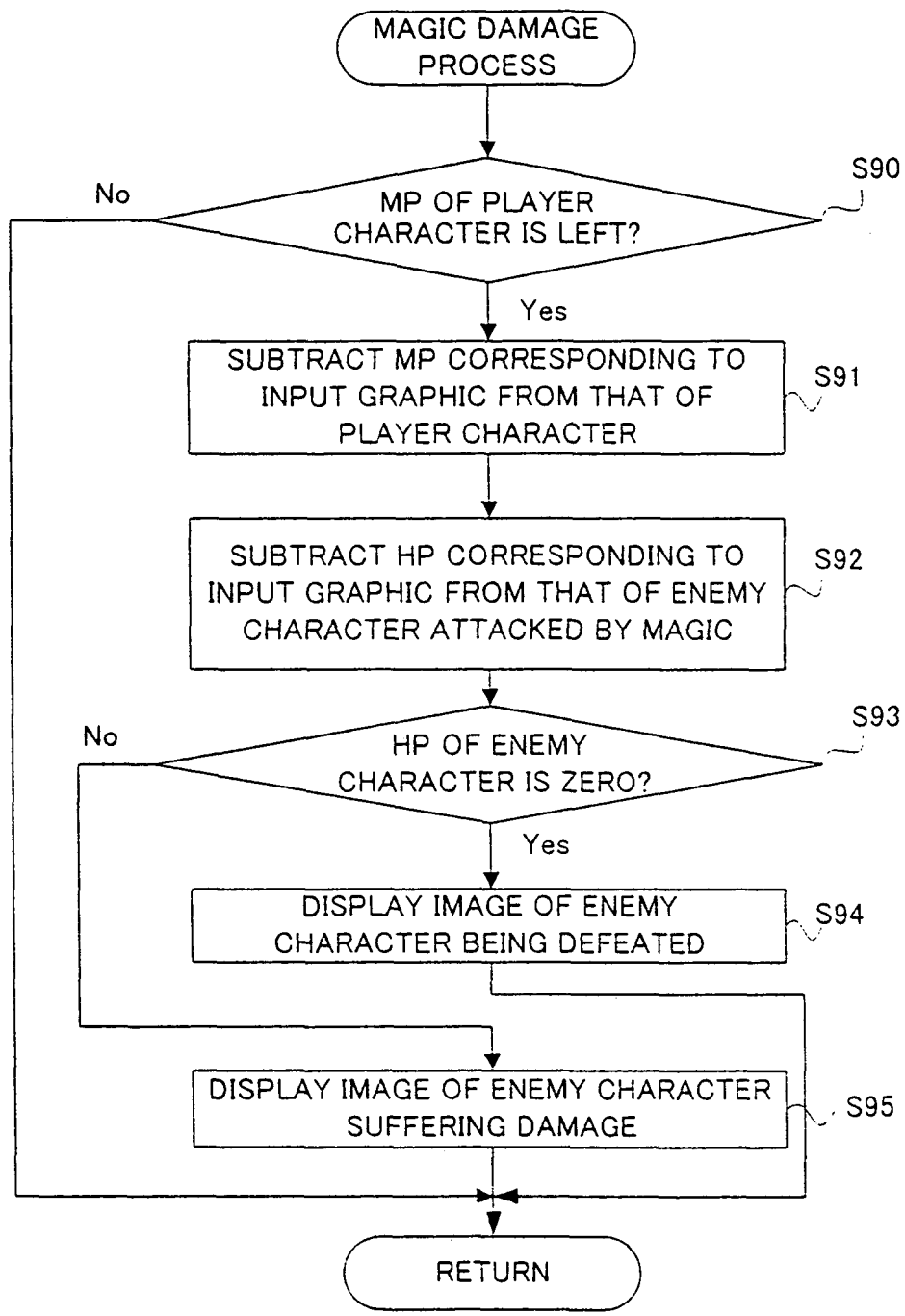
FIG. 31 is a flowchart illustrating a detailed process flow at step S4 shown in FIG. 25.

FIG. 31 is a flowchart showing a detailed process flow at step S5 shown in FIG. 25. In the magic damage process shown in FIG. 31, it is first determined at step S90 whether or not the player character still has the sufficient magic point. The determination is performed with reference to the player character data 57 in the RAM 24. For example, in a case where the required amount of magic point is previously determined for each type or magic, the CPU core 21 calculates the amount corresponding to magic point required for the magic having been determined in the magic determination process, and compares the amount corresponding to the calculated magic point with the amount corresponding to the current magic point of the player character. If it is determined at step S90 that the player character still has the sufficient magic point, a process at step S91 is performed. On the other hand, if it is determined that the player character does not have the sufficient magic point, the magic damage process shown in FIG. 31 ends. Note that, in such a case, the player may be notified that the magic point is not sufficient.

At step S91, a value for the magic point of the player character is changed. Specifically, the CPU core 21 subtracts the amount corresponding to the magic point consumed due to the magic having been determined in the magic determination process from the magic point of the player character. That is, a value for the magic point included in the player character data 57 in the RAM 24 is updated. At the following step S92, a value for the hit point of the enemy character attacked by the magic is changed. Specifically, the CPU core 21 subtracts the amount corresponding to the damage caused by the magic having been determined in the magic determination process from the hit point of the enemy character. That is, a value for the hit point included in the enemy character data 58 in the RAM 2 is updated.

At step S93 following step S92, it is determined whether or not the hit point of the enemy character is zero. The determination can be performed with reference to the enemy character data 58 in the RAM 24. If it is determined at step S93 that the hit point of the enemy character is zero, an image representing the enemy character being defeated is displayed on the first LCD 11 or the second LCD 12 at step S94. On the other hand, if it is determined at step S93 that the hit point of the enemy character is not zero, an image representing the enemy character suffering damage is displayed on the first LCD 11 or the second LCD 12 at step S95. When step S94 or step S95 ends, the CPU core 21 ends the magic damage process shown in FIG. 31.

Again in FIG. 25, a determination at step S6 is performed after the magic damage process at step S5. At step S6, it is determined whether or not the reference pattern table is to be updated. The determination is performed with reference to the history data 59 in the RAM 24. That is, if content of the history data 59 is updated at immediately preceding step S86 and thus a predetermined condition for the history data 59 is satisfied, the CPU core 21 determines that the reference pattern table is to be updated. On the other hand, if the content of the history data 59 is not undated at immediately preceding step S86, or the predetermined condition is not satisfied even with the update, the CPU core 21 determines that the reference pattern table is not to be updated. Note that as examples for the predetermined condition, the amount of change in the average difference area due to the update being equal to or greater than a predetermined value, a value of the average difference area becoming equal to or greater than the predetermined value due to the update, or the like can be considered.

If it is determined at step S6 that the reference pattern table is not to be updated, a process at step S7 is skipped and a process at step S8 is performed. On the other hand, if it is determined that the reference pattern table is to be updated, the process at step S7 is performed. That is, the content of the reference pattern table 50 is updated at step S7. For example, if it is determined at step S6 that the condition, "the amount of change in the average difference area due to an update is equal to or greater than the predetermined value", is satisfied for a reference pattern, the CPU core 21 increments the default reference value of the reference pattern in the reference pattern table 50 by a predetermined value. It can be said that a case where the aforementioned condition is satisfied is the case where the reference pattern used for satisfying the condition is not appropriately inputted by the player. Therefore, the default reference value of the reference pattern is incremented. Accordingly, a condition for identifying the reference pattern can be made less severe, whereby the number of input errors by the player can be decreased. Note that, in an alternative embodiment, the content of the reference value setting table 52 may be changed at step S7.

At step S8, it is determined whether or not the game is over. For example, if the nit point of the player character is zero, it is determined that the game is over. If it is determined at step S8 that the game is not over, the process goes back to step S2, and thereafter, a process at steps S2 to S8 is repeated until the game is over. On the other hand, if it is determined at step S8 that the game is over, the CPU core 21 ends the game process shown in FIG. 25.

As described above, in the present embodiment, "a level of difficulty in input" can be individually set for each reference pattern by setting a reference value of each reference pattern. Accordingly, "the level of difficulty in input" for each reference pattern can be made constant, or conversely, "the level of difficulty in input" for a specific reference pattern can be freely changed.

In an alternative embodiment, default reference values in the reference pattern table 50 and adjustment amounts in the reference value setting table 52 may be changed by the player. Accordingly, the player can freely change the reference values so as to suit his/her operation skill. Also, the game apparatus 10 may allow the player to change the reference values and/or the adjustment amounts based on a condition that a predetermined condition for the game course is satisfied (i.e., the player character acquires a specific item appeared in the game).

Also, when the reference values are changed by the process at step 57 or by an instruction from the player, an effect of the game process may be changed in accordance with the magnitude of the changed reference value. For example, because a larger reference value makes an input of the corresponding reference pattern easier, when a reference value is increased, an adjustment may be performed so as to decrease the amount of damage caused by the corresponding magic on the enemy character.

Also, although a difference area is used as a degree of similarity in the above-described embodiment, the degree of similarity is not limited thereto. The degree of similarity may take any indicator indicating a degree of which a subject graphic and each reference pattern are similar in graphic. For example, although a minimum value for the difference area is zero and it is indicated that the smaller the value, the more similar a subject graphic and a reference pattern are, the degree of similarity in an alternative embodiment may be set such that the bigger the value, the more similar the graphics are. The degree of similarity may, for example, be represented by a range from 0% to 100%. Note that, in such a case, a method for identifying a shape of the subject graphic based on a subtraction value obtained by subtracting the reference value thereof from the degree of similarity is conceivable. Specifically, the game apparatus 10 identifies a shape of a reference pattern having a maximum subtraction value as the shape of the subject graphic.

In the above-described embodiment, a reference pattern is identified by using a value obtained by subtracting a difference area (a degree of similarity) from a reference value thereof. In an alternative embodiment, as long as it is a method for identifying a reference pattern by using a value obtained by changing a value of the degree of similarity based on a reference value and a degree of similarity is not used as it is, any method for identifying a reference pattern may be employed.

In the above-described embodiment, a reference value of a reference pattern is changed and set in accordance with an order of input (step S16). Here, in an altenative embodiment, the game apparatus 10 may change and set a reference value in accordance with a time period remained for input. Specifically, at step S16 of FIG. 26, the CPU core 21 detects an elapsed time period for which measurement is started at step S12, and calculates a time period remained until it reaches a time limit. Reference values are set in accordance with the calculated remained time period. For example, reference values may be increased as the remained time period decreases. As such, when the player feels pressured for not having a sufficient time period for input and thereby performs a less accurate input than intended, the player can successfully input an intended graphic.

Also, in the above-described embodiment, a touch panel is taken as one example of an input device for description, but it is not limited thereto. The input device may be any device being capable of allowing the player to draw a trace on the input surface. For example, the input device may be a mouse.

The present invention is applicable to a game program or a game apparatus having an object that a level of difficulty in input of each reference pattern is freely set regardless a shape of the graphic, or the like.

While the invention has been described in detail, the foregoing description is in all aspects illustrative and not restrictive. It is understood that numerous other modifications and variations can be devised without departing from the scope of the invention.

What is claimed is:

1. A non-transitory storage medium storing a game program to be executed by a computer in a game apparatus comprising an input device for detecting positions designated by a player on an input surface, wherein a storage device of the game apparatus stores shape data indicating, for a plurality of reference patterns, a shape of a reference pattern among the plurality of reference patterns, and also stores a default reference value corresponding to the each of the plurality of reference patterns, the storage medium storing the game program for causing the computer to perform:

calculating an input graphic drawn on the input surface by using the positions detected by the input device;

calculating, for each of the plurality of reference patterns, a score related to a degree of similarity between a shape of one of the plurality of reference patterns indicated by the shape data stored in the storage device and a shape of the input graphic;

setting a reference value for each of the plurality of reference patterns by adjusting the default reference value of each of the plurality of reference patterns by a respective adjustment amount, the respective adjustment amounts being variable as between different reference patterns in the plurality of reference patterns;

identifying the shape of the input graphic from among the plurality of reference patterns by using a result obtained by performing a predetermined calculation for each of the plurality of reference patterns through using the score and the set reference value as an offset to the score; and performing a game process in accordance with the identified shape.

2. The non-transitory storage medium according to claim 1, wherein a different value is set to the reference value to be set for each of the plurality of reference patterns in accordance with an order of input of the input graphic.

3. The non-transitory storage medium according to claim 2, wherein a different game process is performed in accordance with the shape of the input graphic and the magnitude of the reference value set to the reference pattern corresponding to the input graphic.

4. The non-transitory storage medium according to claim 1, wherein a different value is set to the reference value to be set for each of the plurality of reference patterns in accordance with a remaining time period from a start of an input of the input graphic until the predetermined time limit is reached.

5. The non-transitory storage medium according to claim 4, wherein a different game process is performed in accordance with the shape of the input graphic and the magnitude of the reference value set to the reference pattern corresponding to the input graphic.

6. The non-transitory storage medium according to claim 1, wherein:
the game program causes the computer to further perform accepting an input value for the reference value of a predetermined reference pattern, and
the accepted input value is set as the reference value of the predetermined reference pattern.

7. The non-transitory storage medium according to claim 6, wherein a different game process is performed in accordance with the shape of the input graphic and the magnitude of the reference value set to the reference pattern corresponding to the input graphic.

8. The non-transitory storage medium according to claim 1, wherein:
the game program causes the computer to further perform storing, in the game apparatus, a history for the calculated degree of similarity for the reference pattern, and
the reference value to be set for the reference pattern is changed in accordance with the history, for the degree of similarity of the reference pattern, stored in the game apparatus.

9. A game apparatus comprising an input device for detecting positions designated by a player on an input surface, comprising:
a processor;
a memory coupled to said processor, said memory storing instructions that, when executed by said processor, control said processor to:
store shape data indicating, for a plurality of reference patterns, a shape of a reference pattern among the plurality of reference patterns, and store a default reference value corresponding to each of the plurality of reference patterns;
calculate an input graphic drawn on the input surface by using the positions detected by the input device;

calculate for each of the plurality of reference patterns, a score related to a degree of similarity between a shape of one of the plurality of reference patterns indicated by the shape data stored in the storage device and a shape of the input graphic;

set a reference value for each of the plurality of reference patterns by adjusting the default reference value of each of the plurality of reference patterns by a respective adjustment amount, the respective adjustment amounts being variable as between different reference patterns in the plurality of reference patterns;

identify the shape of the input graphic from among the plurality of reference patterns by using a result obtained by performing a predetermined calculation for each of the plurality or reference patterns through using the score and the set reference value as an offset to the score; and perform a game process in accordance with the identified shape.

10. The game apparatus according to claim 9, wherein the a different value is set to the reference value to be set for each of the plurality of reference patterns in accordance with an order of input of the input graphic.

11. The game apparatus according to claim 10, wherein a different game process is performed in accordance with the shape of the input graphic and the magnitude of the reference value set to the reference pattern corresponding to the input graphic.

12. The game apparatus according to claim 9, wherein the a different value is set to the reference value to be set for each of the plurality of reference patterns in accordance with a remaining time period from a start of an input of the input graphic until the predetermined time limit is reached.

13. The game apparatus according to claim 12, wherein a different game process is performed in accordance with the shape of the input graphic and the magnitude of the reference value set to the reference pattern corresponding to the input graphic.

14. The game apparatus according to claim 9, wherein the processor is further controlled to accept an input value for the reference value of a predetermined reference pattern,
wherein the input value accepted is set as the reference value of the predetermined reference pattern.

15. The game apparatus according to claim 14, wherein a different game process is performed in accordance with the shape of the input graphic and the magnitude of the reference value set to the reference pattern corresponding to the input graphic.

16. The game apparatus according to claim 9, wherein the processor is further controlled to store, in the game apparatus, a history for the calculated degree of similarity for the reference pattern,
wherein the reference value to be set for the reference pattern is changed in accordance with the history, for the degree of similarity of the reference pattern, stored in the game apparatus.

17. A method for operating a game apparatus which includes at least one processor and a memory, an input device for detecting positions designated by a player on an input surface, and a storage device for storing shape data indicating, for a plurality of reference patterns, a shape of a reference pattern among the plurality of reference patterns, and for storing a default reference value corresponding to each of the plurality of reference patterns, the method comprising:
calculating an input graphic drawn on the input surface by using the positions detected by the input device;

calculating, for each of the plurality of reference patterns, a score related to a degree of similarity between a shape of one of the plurality of reference patterns indicated by the shape data stored in the storage device and a shape of the input graphic;

setting a reference value for each of the plurality of reference patterns by adjusting the default reference value of each of the plurality of reference patterns by a respective adjustment amount, the respective adjustment amounts being variable as between different reference patterns in the plurality of reference patterns;

identifying, in connection with the at least one processor, the shape of the input graphic from among the plurality of reference patterns by using a result obtained by performing a predetermined calculation for each of the plurality of reference patterns through using the score and the set reference value as an offset to the score; and performing a game process on the game apparatus in connection with the at least one processor and in accordance with the shape identified.

18. The method according to claim 17, wherein the reference value setting sets a different value to the reference value to be set for each of the plurality of reference patterns in accordance with an order of input of the input graphic.

19. The method according to claim 18, wherein the game processing performs a different game process in accordance with the shape of the input graphic and the magnitude of the reference value set to the reference pattern corresponding to the input graphic.

20. The method according to claim 19, wherein the reference value setting sets a different value to the reference value to be set for each of the plurality of reference patterns in accordance with a remaining time period from a start of an input of the input graphic until the predetermined time limit is reached.

21. The method according to claim 20, wherein the game processing performs a different game process in accordance with the shape of the input graphic and the magnitude of the reference value set to the reference pattern corresponding to the input graphic.

22. The method according to claim 17, further comprising accepting an input value for the reference value of a predetermined reference pattern, wherein the reference value setting sets the input value accepted by the input accepting as the reference value of the predetermined reference pattern.

23. The method according to claim 22, wherein the game processing performs a different game process in accordance with the shape of the input graphic and the magnitude of the reference value set to the reference pattern corresponding to the input graphic.

24. The method according to claim 17, further comprising for storing, in the game apparatus, a history for the degree of similarity calculated by the degree of similarity calculating for the reference pattern, wherein the reference value setting changes the reference value to be set for the reference pattern in accordance with the history, for the degree of similarity of the reference pattern, stored in the game apparatus.

25. The non-transitory storage medium according to claim 1, wherein:

for each of the plurality of reference patterns, a degree of dissimilarity between a shape of one of the plurality of reference patterns indicated by the shape data stored in the storage device and the shape of the input graphic is calculated; and the shape of the input graphic is identified from among the plurality of reference patterns by using a difference between the reference value set to each of the plurality of reference patterns and the calculated degree of dissimilarity.

26. The non-transitory storage medium of claim 1, wherein the respective adjustment amounts are correlated with effect levels associated with their corresponding shapes.

27. The non-transitory storage medium of claim 26, wherein the greater the effect level, the smaller the adjustment amount.

28. The non-transitory storage medium of claim 1, wherein the adjustment amounts are variable for individual ones of said reference patterns.

29. The non-transitory storage medium of claim 1, wherein an adjustment amount varies by increasing as further shapes are identified for at least some individual ones of said reference patterns.

30. The non-transitory storage medium of claim 1, wherein an adjustment amount varies by increasing based on how many times a shape associated with that reference pattern has been identified for at least some individual ones of said reference patterns.

31. The non-transitory storage medium of claim 1, wherein plural shapes are identifiable, in sequence, to cause different effects during the game process.

32. The non-transitory storage medium of claim 1, wherein for each of the plurality of reference patterns, the score is calculated by determining a value for a difference area between the calculated input graphic and the respective reference pattern.

33. The non-transitory storage medium of claim 32, wherein the predetermined calculation used in the identifying includes, for each of the plurality of reference patterns, subtracting the value for the respective difference area from the respective set reference value.

* * * * *